(12) United States Patent  (10) Patent No.: US 9,035,872 B2
Brown et al.  (45) Date of Patent: May 19, 2015

(54) DETECTION SYSTEM AND METHOD BETWEEN ACCESSORY AND ELECTRONIC DEVICE

(75) Inventors: Matthew I. Brown, San Francisco, CA (US); Nicholas Zambetti, San Francisco, CA (US); Samuel G. Smith, Cupertino, CA (US); Michael A. Cretella, Jr., San Francisco, CA (US); Chris Mullens, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 14 days.

(21) Appl. No.: 13/612,403

(22) Filed: Sep. 12, 2012

(65) Prior Publication Data

US 2013/0328825 A1 Dec. 12, 2013

Related U.S. Application Data

(60) Provisional application No. 61/681,117, filed on Aug. 8, 2012, provisional application No. 61/657,693, filed on Jun. 8, 2012.

(51) Int. Cl.
*G09G 5/00* (2006.01)
*G06F 3/01* (2006.01)
*G06F 3/044* (2006.01)
*G06F 1/16* (2006.01)
*G06F 3/041* (2006.01)
*G06F 3/0488* (2013.01)

(52) U.S. Cl.
CPC *G06F 3/01* (2013.01); *G06F 3/044* (2013.01); *G06F 1/1613* (2013.01); *G06F 3/041* (2013.01); *G06F 1/1626* (2013.01); *G06F 2200/1634* (2013.01); *G06F 2203/04803* (2013.01); *G06F 3/04886* (2013.01); *G09G 5/00* (2013.01); *G09G 2320/0686* (2013.01); *G09G 2330/021* (2013.01); *G09G 2340/04* (2013.01); *G09G 2360/144* (2013.01)

(58) Field of Classification Search
CPC .......... G06F 1/1626; G06F 2200/1634; G06F 3/044; G06F 3/04886
USPC ................................................. 345/156–174
See application file for complete search history.

(56) References Cited

U.S. PATENT DOCUMENTS

| | | | |
|---|---|---|---|
| 7,288,934 B1 * | 10/2007 | Ikarashi et al. | 324/207.21 |
| 7,541,907 B2 * | 6/2009 | Wang et al. | 335/305 |
| 8,030,914 B2 | 10/2011 | Alameh et al. | |
| 8,143,982 B1 | 3/2012 | Lauder et al. | |
| 2011/0153739 A1 | 6/2011 | McCoy | |
| 2011/0192857 A1 * | 8/2011 | Rothbaum et al. | 220/694 |
| 2011/0303741 A1 | 12/2011 | Bolten et al. | |
| 2011/0316655 A1 * | 12/2011 | Mehraban et al. | 335/207 |
| 2012/0019674 A1 | 1/2012 | Ohnishi et al. | |
| 2012/0072167 A1 | 3/2012 | Cretella, Jr. et al. | |
| 2012/0109455 A1 | 5/2012 | Newman et al. | |
| 2012/0194308 A1 | 8/2012 | Lauder et al. | |
| 2012/0194448 A1 | 8/2012 | Rothkopf | |
| 2013/0149964 A1 * | 6/2013 | Kreiner | 455/41.2 |

OTHER PUBLICATIONS

International Search Report and Written Opinion mailed Nov. 13, 2013 in PCT/US2013/052793.

* cited by examiner

*Primary Examiner* — Viet Pham
(74) *Attorney, Agent, or Firm* — Downey Brand LLP

(57) ABSTRACT

Accurate and reliable techniques for determining information of an accessory device in relation to an electronic device are described.

20 Claims, 18 Drawing Sheets

DETECTION SYSTEM AND METHOD BETWEEN ACCESSORY AND ELECTRONIC DEVICE

CROSS REFERENCE TO RELATED APPLICATIONS

This application claims priority under 35 U.S.C. 119(e) to U.S. Provisional Patent Application No. 61/681,117, filed Aug. 8, 2012 and entitled "Consumer Electronic Product" by Sartee et al., and U.S. Provisional Patent Application No. 61/657,693, filed Jun. 8, 2012 and entitled "Smart Cover Peek" by Zambetti, each of which is herein incorporated by reference in its entirety. This application is also related to U.S. patent application Ser. No. 13/612,416, entitled "Peek Mode And Graphical User Interface (GUI) Experience", now U.S. Pat. No. 8,847,979.

FIELD OF THE DESCRIBED EMBODIMENTS

The described embodiments generally relate to accessory devices used with portable electronic devices. More particularly, the present embodiments describe passive and active circuits that can be used individually or in combination to identify specific characteristics of the accessory device. The identified characteristics can be used by the portable electronic device to alter an operating state of the electronic device, identify specific features of the accessory device, and so forth.

DESCRIPTION OF THE RELATED ART

Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display used for presenting visual content leaving little available space for an attachment mechanism that can be used for attaching an accessory device.

The display can include various user interface features that can interact with external stimuli to convey information from an end user, for example, and processing circuitry in the hand held computing device. For example, the display can include touch sensitive elements that can be used to enable various multi-touch (MT) functions. When the accessory device takes the form of a cover, the handheld computing device can be operable in modes consistent with the presence of the cover. For example, when the handheld computing device has a display, the presence of the cover can render the display unviewable. In order to save power, the unviewable display can be rendered temporarily inoperable until the cover is moved or otherwise repositioned to expose the display.

Therefore, accurate and reliable techniques for determining selected aspects of an accessory device are desired.

SUMMARY OF THE DESCRIBED EMBODIMENTS

This paper describes various embodiments that relate to a system, method, and apparatus for passively providing information from an accessory device to a host device. In one embodiment, the accessory device takes the form of a protective cover and the host device takes the form of a tablet computer.

In one embodiment, accessory device is described. The accessory device includes at least a flap where the flap includes at least a passive information element associated with accessory device information. The accessory device also includes an attachment mechanism configured for releasably attaching the accessory device and an electronic device. In the described embodiment, the electronic device includes a processor, a display, an attachment detection mechanism configured to detect that the accessory device is attached to the electronic device, and a passive information detection mechanism that is enabled to (1) detect the presence of the passive information element, and (2) receive information from the passive information element only when the attachment detection mechanism provides an indication that the accessory device and the electronic device are attached to each other.

In another embodiment a method for altering an operating state of an electronic device in accordance with accessory device information associated with an accessory device is described. The method is carried out by performing at least the following operations: detecting the passive information element by a detection mechanism in the electronic device, determining the accessory device information based upon the detecting, and altering the operating state of the electronic device in accordance with the accessory device information.

Non-transitory computer readable medium for altering an operating state of an electronic device having a processor and a display are described. The computer readable medium includes at least computer code for detecting the passive information element by a detection mechanism in the electronic device, computer code for determining accessory device information based upon the detecting of the passive information element, and computer code for altering the operating state of the electronic device in accordance with the accessory device information.

In yet another embodiment, an accessory device is described. The accessory device includes an attachment mechanism for attaching the accessory device to an electronic device having a display and a processor. The accessory device includes at least a flap having a size and shape in accordance with the display and an information element. In the described embodiment, the information element is associated with accessory device information such that when the information element is detected by a detection mechanism in the electronic device. The detection mechanism provides the accessory device information to the processor. The processor uses the accessory device information to alter an operating state of the electronic device. Generally, the detection occurs only when the flap and the display are in close proximity to each other.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Figure 1:
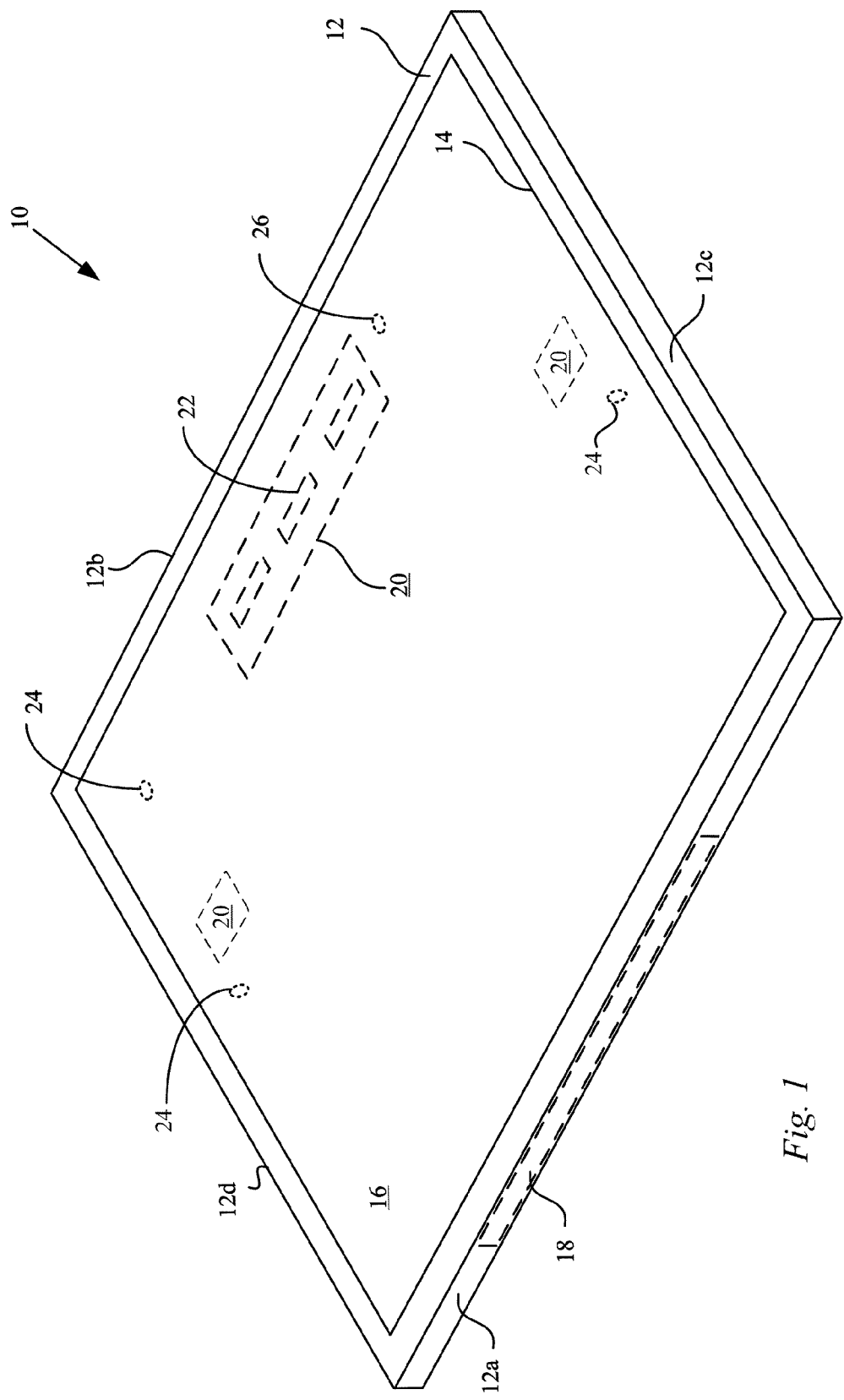
FIG. 1 shows a top perspective view of an electronic device in accordance with the described embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism that can be used to identify characteristics of an accessory device used with an electronic device having a display. The display can be configured to present visual content. In some cases, the display can include a touch sensitive layer configured to sense externally applied stimuli, such as a touch event, and in response, provide information that can be used by the electronic device. For example, the display can include capacitive based multi-touch (MT) functionality well suited for recognizing concurrently applied multiple input events In a particular embodiment, the accessory device takes the form of a protective cover. The protective cover can include a flap pivotally connected to a hinge mechanism. The hinge mechanism, in turn, can include an attachment mechanism for releasably attaching together the protective cover and the electronic device. The flap can have a size and shape in accordance with the display. In this way, when coupled with the tablet device, the flap can rotate about the hinge portion in a first direction to bring the flap in substantial contact with the display in a closed configuration. Conversely, the flap can pivot about the hinge assembly in a second direction opposite the first direction to expose the display, or a portion thereof, in an open configuration. In one embodiment, the electronic device can take the form of a tablet device.

The protective cover can provide protection to certain aspects (such as the display) of the tablet device while enhancing the overall look and feel of the tablet device. The protective cover can include electronic circuits or other elements (passive or active) that can cooperate with elements, electronic or otherwise, in the tablet device. As part of that cooperation, signals can be passed between the protective cover and the tablet device that can, for example, be used to modify operations of the tablet device, operations of electronic circuits or elements of the protective cover, and so forth. The signals can also be used to evaluate certain aspects of the protective cover. For example, the protective cover can include an object, or objects, that can be detected by corresponding elements disposed within the tablet device. The object(s) can provide information to the tablet device that can be used to identify certain aspects of protective cover, such as color, style, owner, etc. The objects can be passive or active. For example, passive elements can take the form of magnets and capacitive elements, whereas active elements can take the form of RFID tags, near field communication (NFC) elements, wireless elements (such as Bluetooth™), and so forth.

The electronic device can include a number of sensors. These sensors can include at least a number of different types of magnetic sensors. For example, a Hall Effect sensor (HFX) can simply detect a presence of a magnetic field providing information along the lines of ON/OFF, "0", "1", and so forth. In addition to using a number of magnets to encode information, polarities of the magnets can be used to encode information. For example, when the protective cover has n magnets detectable by a corresponding magnetic sensor disposed in the tablet device that can discern magnetic polarity, there can be 2" bits of information magnetically encoded in the protective cover. In a particular embodiment, the number n of magnets can be four in which case, the total number of information bit is also four representing a $2^4$ or 32 information states. The 32 information states can include information related to specific aspects of the protective cover such as color, style, owner information, purchase date, and so forth.

A linear Hall Effect sensor can be used to sense the motion, position, or change in field strength of a magnet. Differences in the magnetic field strength detected by the linear Hall Effect sensor can be used to evaluate a current status of the protective cover with respect to the tablet device. For example, a change in detected magnetic field strength value can indicate that a change in the tablet device/protective cover attachment status has changed or that a relative distance between the magnet and the linear Hall Effect sensor has changed. This change in relative distance can indicate that the protective cover has moved relative to the tablet device. For example, a linear Hall Effect sensor measuring a relative change in magnetic field strength value of 5 milli-Tesla (mT) can indicate that the protective cover has moved to a more open position or a more closed position relative to the tablet device. It should also be noted that monitoring the magnetic field strength value in real time (or sampling) can indicate motion of the protective cover in relation to the tablet device. In this way, motion of the protective cover with respect to the tablet device can be detected as well as the direction of the motion of the protective cover in relation to the tablet device.

In order to enhance the affect of magnets in either the tablet device or the protective cover, certain magnets can be arranged as a magnetic array. One such magnetic array can take the form of a Halbach array. The Halbach array can be construed as a one side magnetic flux structure having an augmented magnetic field on one side of the Halbach array and a magnetic field near zero on an opposite side of the Halbach array. This effect can be realized by arranging a number of permanent magnets in a spatially rotating pattern of magnetization. In this way, using the Halbach array to provide an augmented one sided magnetic field can improve magnetic attachment between the protective cover and the tablet device or the detectability of the resulting augmented magnetic field.

In some embodiments, components disposed within or on the protective cover can be used to determine a relationship between the protective cover and the tablet device. For example, when the cover includes magnets (for attachment purposes, information signaling purposes, etc.), these magnets can affect magnetically sensitive circuits (such as a magnetometer used in some cases as a magnetic compass) disposed in an adjoining tablet device that can be used as a signal. This signal can, in turn, be used to deduce a spatial relationship between the protective cover and the tablet device. For example, when the tablet device includes a magnetic circuit in the form of a magnetic compass, magnets in the protective cover can cause the magnetic compass to experience a magnetic offset (a deviation from a baseline compass direction) having a magnetic offset value (generally expressed in degrees, "x°"). Accordingly, the magnetic offset value can be used to deduce a relationship between the protective cover and the tablet device. An observed magnetic offset value can be correlated to a known tablet/cover configuration, such a magnetically attached, fully open configuration, fully closed configuration, or partially open configuration. In some case, it may be desirable to recalibrate the magnetic compass based upon the spatial relationship between the cover and the tablet device. For example, when the cover is fully open the affect of magnets in the cover on the magnetic compass can be minimal, however, as the cover is brought closer to a fully closed position and the compass remains viewable (such as in peek mode), then the affect of the magnets can be greater requiring a re-calibration of the magnetic compass.

Sensors can also be used to determine an angular displacement of the protective cover and the tablet device. For example, the linear Hall Effect sensor can be used to detect an angular displacement of a magnet in the cover with respect to the linear Hall Effect sensor. The angular displacement can be correlated to magnetic field strength (measured in milli-Tesla, or MT, for example) detected by the linear Hall Effect sensor and any changes in the detected values can be associated with a change in a spatial relationship between the tablet device and the protective cover. The change in spatial relationship can include pivoting of the cover away or towards the tablet device.

In another embodiment, when the tablet device includes an optical sensor, such as an image capture device such as a camera or ambient light sensor (ALS) for detecting ambient light levels in vicinity of the camera, information can be encoded by the protective cover using optically sensitive indicia. For example, the protective cover can include openings suitably sized and located that permit selected amounts of light to penetrate through the protective cover. For example, a pattern of micro-perforations can be formed in the protective cover that although not discernible by a user can nonetheless allow sufficient light to reach an optical sensor in line with the micro-perforations. In this way, the pattern of light reaching the optical sensor can provide information that can be used by the tablet device. In some cases, the pattern of micro-perforations can be akin to a bar-code providing information specific to the protective cover. Such information can include serial number, style, color, and so forth. In one embodiment, the ALS can include a photosensitive circuit (such as a photodiode) that can respond to varying levels of incident light, typically in the form of ambient light. The optical sensors can also be sensitive to light beyond the visible spectrum. For example, an infrared (IR) sensor can detect the presence of heat whereas a UV sensitive detector can determine the presence of a UV light source, such as the sun.

In one embodiment, the display can include a touch sensitive surface that can respond to objects incorporated into the protective cover. The touch sensitive surface can include a number of elements that can couple with some or all of the plurality of objects on or near the protective layer of the display. The coupling can, for example, be capacitive in nature and provide signals that can be evaluated by a processor in the tablet device. The signals can be used, for example, in controlling certain aspects of the operation of the tablet device. In one embodiment, the object, or objects, can take the form of electrically conductive elements embedded in the flap of the protective cover. In this way, when the protective cover is brought near or into contact with the protective layer of the display, the electrically conductive elements can interact with the capacitive elements providing signals to the processor.

The signals provided to the processor can correspond to a size, position, and shape of the electrically conductive objects. Therefore, the size, position, and shape of the electrically conductive objects can be associated with information that can be used by the processor. The information can, for example, be used by the processor to determine aspects of the protective cover based upon information associated with specific configurations of the conductive objects. Accordingly, any number of characteristics of the objects such as the size, shape, orientation, position, etc. of the objects can be used to passively convey information from the flap of the protective cover to the processor. This information can then be used by the processor to execute instructions that can be used to carry out any number of operations by the tablet device. The information can also be used to convey information specific to the protective cover (such as type, color, style, specific serial number).

These and other embodiments are discussed below with reference to FIGS. 1-16. However, those skilled in the art will readily appreciate that the detailed description given herein with respect to these figures is for explanatory purposes only and should not be construed as limiting.

The electronic device can take many forms. For the remainder of this discussion, the electronic device is described in terms of a handheld portable computing device. Accordingly, FIG. 1 shows a top perspective view of electronic device 10 in accordance with the described embodiments. Electronic device 10 can process data and more particularly media data such as audio, visual, images, etc. By way of example, electronic device 10 can generally correspond to a device that can perform as a smart phone, a music player, a game player, a visual player, a personal digital assistant (PDA), a tablet device and the like. With regards to being handheld, electronic device 10 can be held in one hand while being operated by the other hand (i.e., no reference surface such as a desktop is needed). Hence, electronic device 10 can be held in one hand while operational input commands can be provided by the other hand. The operational input commands can include operating a volume switch, a hold switch, or by providing inputs to a touch sensitive surface such as a touch sensitive display device or a touch pad.

Electronic device 10 can include housing 12. In some embodiments, housing 12 can take the form of a single piece housing formed of any number of materials such as plastic or non-magnetic metal which can be forged, molded, or otherwise formed into a desired shape. In those cases where electronic device 10 has a metal housing and incorporates radio frequency (RF) based functionality, a portion of housing 12 can include radio transparent materials such as ceramic, or plastic. Housing 12 can be configured to enclose a number of internal components. The internal components can be mechanical or structural used to provide support or they can be operational/functional components that can provide a specific set of operations/functions. For example, housing 12 can enclose and support various structural and electrical components (including integrated circuit chips) to provide computing operations for electronic device 10. Examples of operational components can include integrated circuits, processors, memory, batteries, antennas, circuitry, sensors, display, inputs, and so on. The integrated circuits can take the form of chips, chip sets, or modules any of which can be surface mounted to a printed circuit board, or PCB, or other support structure. For example, a main logic board (MLB) can have integrated circuits mounted thereon that can include at least a microprocessor, semi-conductor memory (such as FLASH), and various support circuits and so on. Examples of structural components can include frames, walls, fasteners, stiffeners, movement mechanisms (hinge), etc. Depending on their desired configuration, the components can be external (i.e., exposed at the surface) and/or internal (e.g., embedded within housing).

Housing 12 can include opening 14 for placing internal components and as necessary can be sized to accommodate a display assembly for presenting visual content, the display assembly being covered and protected by protective cover layer 16. In some cases, the display assembly can be touch sensitive allowing tactile inputs that can be used to provide control signals to electronic device 10. In some cases, the display assembly can be a large prominent display area that covers a majority of the real estate on the front of the electronic device.

Electronic device 10 can include attachment features that correspond with attachment features in an accessory device such as a protective cover. In this way, the protective cover and electronic device 10 can attach to each other in a releasable manner. When attached to each other, the protective cover and electronic device 10 can operate as a single operating unit. On the other hand, in the detached mode, the protective cover and electronic device 10 can act separately, and if desired, as two individual parts. The attachment between the protective cover and electronic device 10 can be widely varied. For example, the protective cover and electronic device 10 do not generally include external visible attachment features that adversely affect the look and feel or ornamental appearance (e.g., snaps, latches, etc.), but rather attachment features that cannot be seen from the outside of the protective cover or electronic device 10 and thus do not affect the look and feel or ornamental appearance of the protective cover or electronic device 10. By way of example, the attachment features can be provided by attraction surfaces that do not disturb the external surfaces of the protective cover or electronic device 10. In one embodiment, at least a portion of the attachment features utilize magnetic attraction to provide some or all of the attaching force.

Accordingly, electronic device 10 can include magnetic attachment system 18 and magnetic attachment system 20. Magnetic attachment system 18 can be side mounted to housing 12 and be used to magnetically attach electronic device 10 to an appropriately configured accessory such as the protective cover. Magnetic attachment system 20 on the other hand can be located within opening 14 and beneath cover glass 16 and can include one or more of magnetic elements 22. In one embodiment, magnetic elements 22 can be configured in a magnetic array (such as the Halbach array) to enhance a magnetic field presented to a corresponding magnetically compatible element in the protective cover. Magnetic attachment system 20 can be positioned at various locations within opening 14. For example, magnetic attachment system 20 can be positioned in proximity to side walls 12c and 12d. In this way, lateral movement (referred to as racking) of the protective cover while attached to electronic device 10 can be substantially reduced.

It should be noted that magnetic elements 22 can affect magnetically sensitive circuits such as Hall Effect sensor 24 and magnetometer circuit 26 in the form of onboard compass 26. Therefore, in some cases, field shaping elements can be used to reduce magnetic affects experienced by such circuits. For example, field shaping magnets can be used to control the shape and extent of a magnetic field generated by magnetic elements 22. In some cases, the shape and positioning of magnetic elements 22 can help to prevent magnetic flux leakage that could otherwise affect the sensitive magnetic circuits. For example, magnetic elements 22 can have a trapezoidal shape (or other appropriate geometry) well suited to reduce an amount of magnetic flux leakage that can affect, for example, on-board compass 26.

Figure 2A:
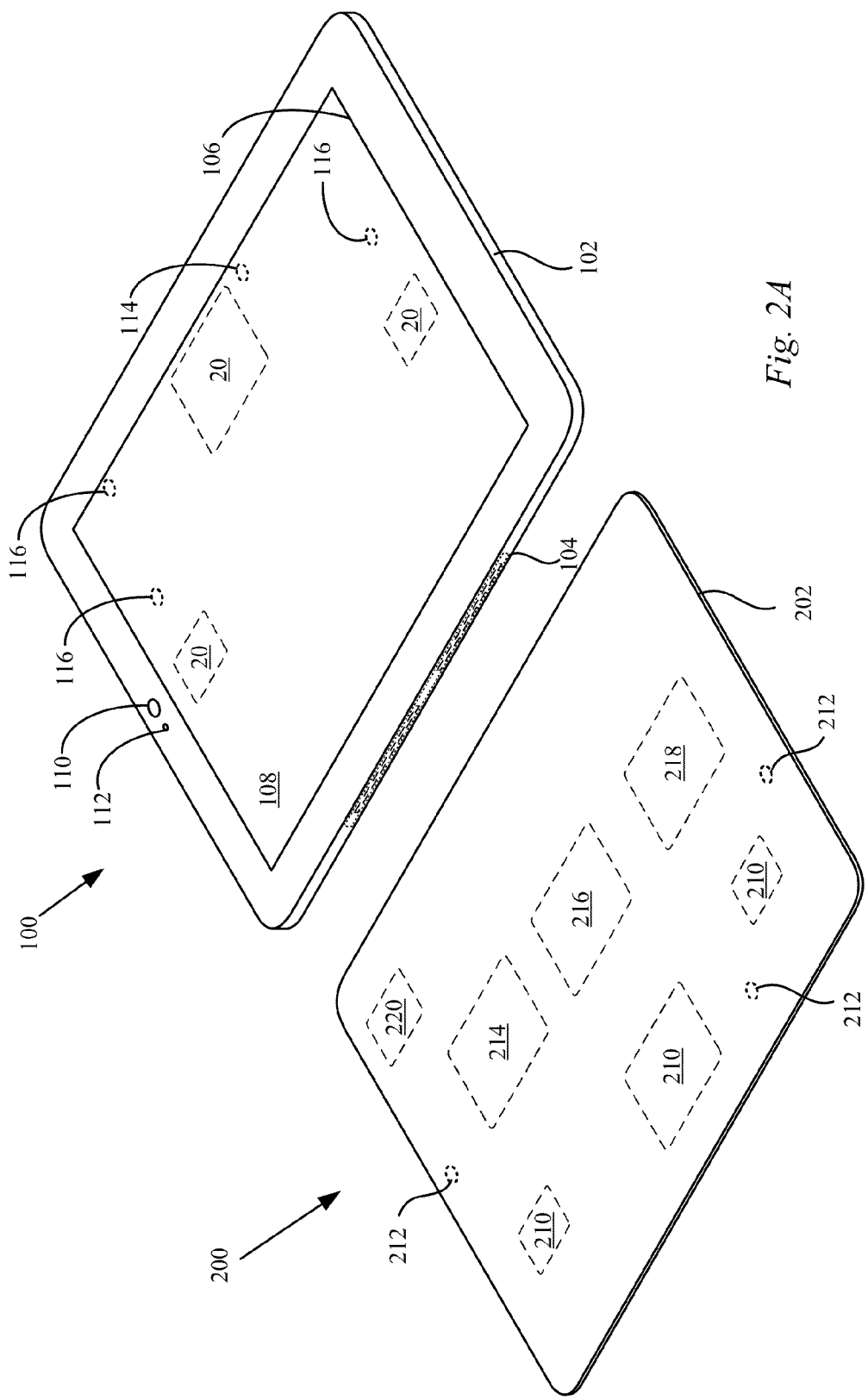
FIG. 2A shows a first perspective view of the electronic device in the form of a tablet device and the accessory device in the form of a protective cover.
Figure 2B:
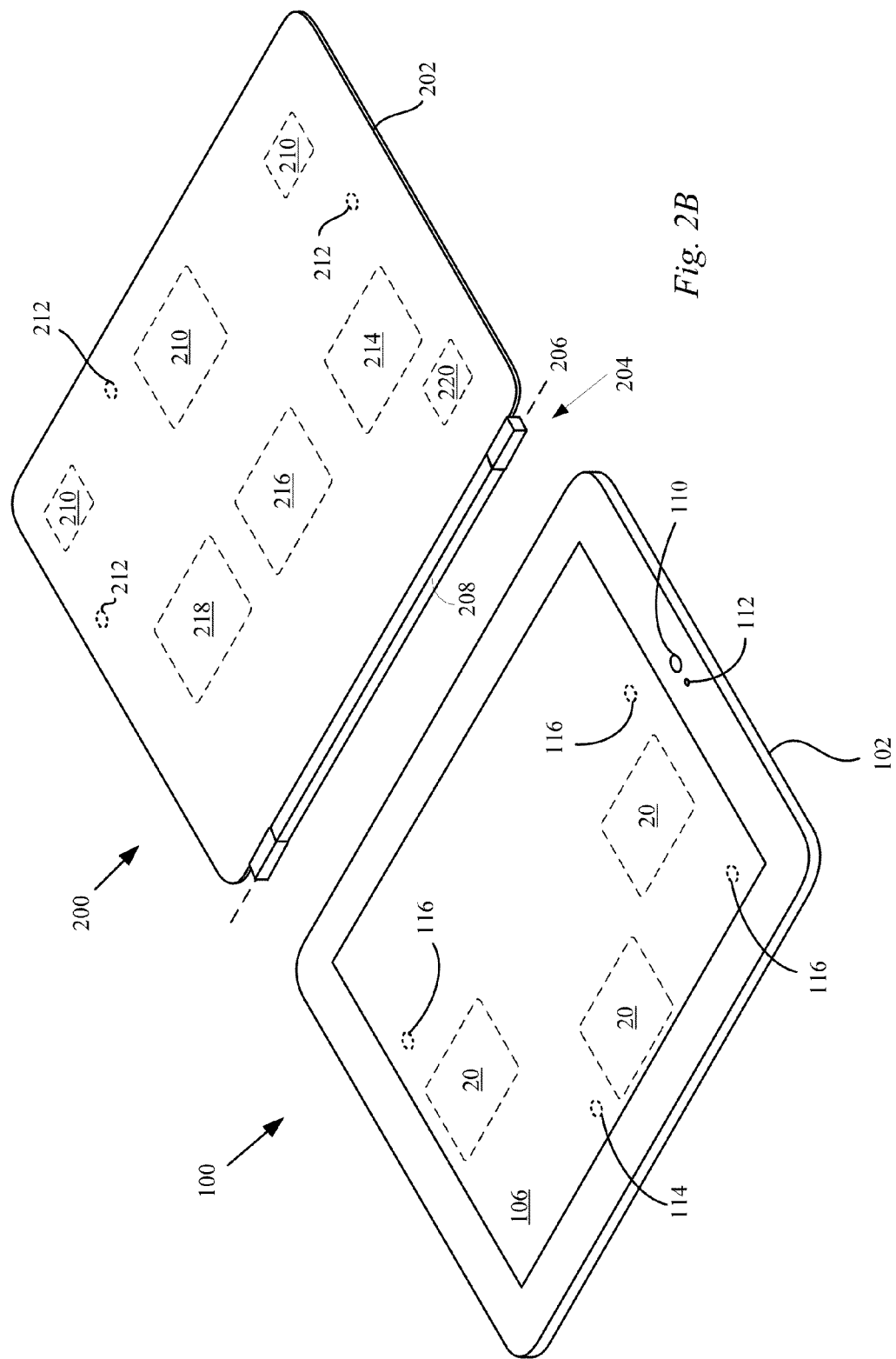
FIG. 2B shows a second perspective view of the electronic device in the form of a tablet device and the accessory device in the form of a protective cover.

FIG. 2A and FIG. 2B show electronic device 10 presented in terms of a particular embodiment in the form of tablet device 100 in relation to an accessory device presented as protective cover 200 each in perspective top views. In particular, FIGS. 2A and 2B shows two perspective views of tablet device 100 and protective cover 200 in the open configuration. For example, FIG. 2A shows a magnetic surface provided by magnetic attachment system 104 disposed in housing 102. FIG. 2B, on the other hand, is the view presented in FIG. 2A rotated about 180° to provide a second view of attachment feature 204 and its relationship with protective cover 200.

Referring now to FIG. 2A, tablet device 100 can include housing 102 that can enclose and support magnetic attachment system 104. Tablet device 100 can take the form of a particular member of a family of tablet computing devices such as the iPad™ manufactured by Apple Inc. of Cupertino, Calif. So as not to interfere with the magnetic field generated by magnetic attachment system 104, at least that portion of housing 102 nearest magnetic attachment system 104 can be formed of any number of non-magnetic materials such as plastic or non-magnetic metal such as aluminum. Magnetic attachment system 104 can be configured to provide a variable magnetic surface at housing 102. The variable magnetic surface can be in accordance with an attachment state of magnetic attachment system 104. For example, a first magnetic surface can have a magnetic strength value that is less than a first threshold value and thus is unsuitable for creating a magnetic circuit capable of forming a suitable attachment and unsuitable for adversely affecting a magnetically sensitive device in proximity to tablet device 100. The first magnetic surface can, therefore, be associated with magnetic attachment system 104 being inactive.

In some embodiments, magnetic attachment system 104 can have movable magnetic elements that can cause the magnetic surface to change from the first magnetic surface to a second magnetic surface that is suitable for forming and maintaining a magnetic attachment and is therefore active. In one embodiment, the movable magnetic elements can be held away from housing 102 in the inactive state and be impelled towards housing 102 in the active state thereby causing the first magnetic surface to transition to the second magnetic surface consistent with magnetic attachment system 104 transitioning from inactive to active, respectively.

In one embodiment, detectors disposed within housing 102 can determine if magnetic attachment system 104 is active or inactive. For example, when magnetic attachment system 104 includes movable magnetic elements, then a linear Hall Effect sensor can provide information that can be used to deduce the state of magnetic attachment system 104 by providing magnetic field strength values and any changes thereof. With those magnetic attachment systems having movable magnetic elements, the data provided by the linear Hall Effect sensor can indicate relative position of the movable magnetic elements and therefore if motion has occurred. Movement of the movable magnetic elements can also be detected using a more direct approach such as a tact switch that can directly detect movement of the movable magnetic elements in magnetic attachment system 104. Detectors that are displaced from magnetic attachment system 104 (such as a magnetometer such as compass 26) can detect a change in a local magnetic environment that can be correlated to the state of magnetic attachment system 104. For example, if compass 26 experiences a magnetic offset consistent with magnetic attachment system 104 being active (such as the magnetic offset being greater than a threshold), then it can be deduced that magnetic attachment system 104 is active and tablet device 100 and protective cover 200 are magnetically attached to each other. This information can be used in addition to sensor information to deduce that if attached, protective cover 200 is in a partially open configuration with respect to tablet device 100.

Housing 102 can also enclose and support internally various structural and electrical components (including integrated circuit chips and other circuitry) to provide computing operations for tablet device 100. Housing 102 can include opening 106 for placing internal components and can be sized to accommodate a display assembly or system suitable for providing a user with at least visual content as for example via a display. In some cases, the display assembly can include touch sensitive capabilities providing the user with the ability to provide tactile inputs to tablet device 100 using touch inputs. The display assembly can be formed of a number of layers including a topmost layer taking the form of transparent cover glass 108 formed of polycarbonate or other appropriate plastic or highly polished glass. Using highly polished glass, cover glass 108 can substantially fill opening 106.

Although not shown, the display assembly underlying cover glass 108 can be used to display images using any suitable display technology, such as LCD, LED, OLED, electronic or e-inks, and so on. The display assembly can be placed and secured within the cavity using a variety of mechanisms. In one embodiment, the display assembly is snapped into the cavity. It can be placed flush with the adjacent portion of the housing. In this way, the display can present visual content that can include visual, still images, as well as icons such as graphical user interface (GUI) that can provide information the user (e.g., text, objects, graphics) as well as receive user provided inputs. In some cases, displayed icons can be moved by a user to a more convenient location on the display.

Tablet device 100 can include camera assembly 110 arranged to capture an image or images. Tablet device 100 can also include ambient light sensor 112 (ALS) used to detect a level of ambient light associated with camera assembly 110. In one embodiment ALS 112 can be used to set a brightness level of the display assembly. For example, in a darker environment with little ambient light, the readings from ALS 112 can cause a processor in tablet device 100 to dim the display assembly. In a brighter environment, the display assembly can be made brighter. Tablet device can further include compass 114 used to detect external magnetic fields that can help in the determination of a geographical location of tablet device 100. Moreover, a magnetically sensitive circuit (such as compass 114) can be used to determine a state of magnetic attachment system 104 by detecting a change in the local magnetic environment. This change can be represented as a magnetic offset.

Tablet device 100 can also include Hall Effect (HFX) sensor 116 that can be used to detect various properties of a corresponding magnetic element. In some embodiments, tablet device 100 can include more than one HFX sensor and/or multiple HFX sensors of varying types. For example, tablet device 100 can include an HFX sensor to detect if cover 200 is in the open or closed configuration. Tablet device 100 can also include a linear HFX sensor to detect angular displacement of magnetic elements in flap 202. In this way, various magnetic properties such as magnetic field strength (static and dynamic), magnetic field polarity, angular position of a magnet in relation to the sensor, can be used to determine aspects of tablet device 100/cover 200. Other types of sensors can include inertial sensors along the lines of an accelerometer and gyroscope (neither shown) can be used to determine any dynamic changes in the position and orientation of tablet device 100 in real time.

Figure 3A:
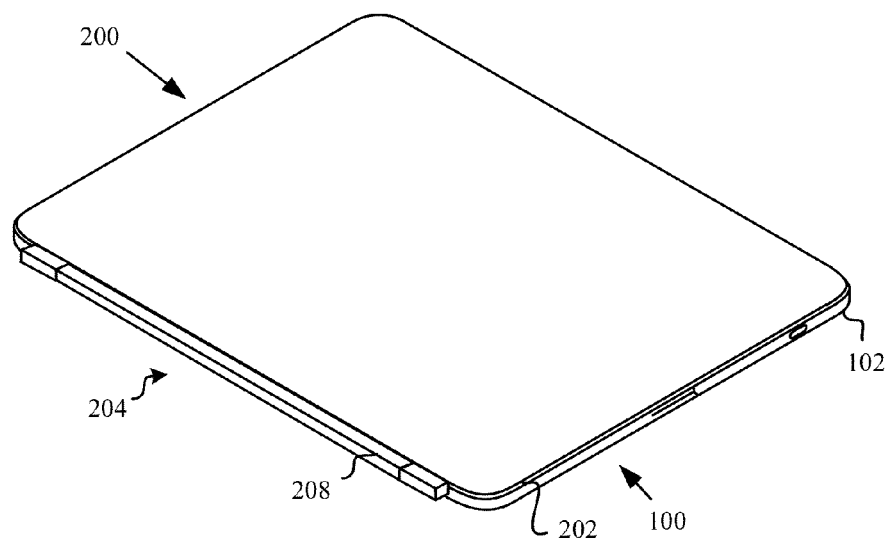
FIG. 3A shows a closed configuration of the cooperating system formed by the tablet device and protective cover shown in FIGS. 2A and 2B.

Protective cover 200 can include flap 202. In one embodiment, flap 202 can have a size and shape in accordance with cover glass 108. Flap 202 can be pivotally connected to hinge assembly 204 shown in FIG. 2B. In this way, flap 202 can rotate about pivot line 206. Hinge assembly 204 can include a magnetic attachment feature 208. The magnetic attachment force between magnetic attachment feature 208 and magnetic attachment system 104 can maintain protective cover 200 and tablet device 100 in a proper orientation and placement vis-a-vis flap 202 and cover glass 108. By proper orientation it is meant that protective cover 200 can only properly attach to tablet device 100 having flap 202 and cover glass 108 aligned in a mating engagement. The mating arrangement between cover glass 108 and flap 202 is such that flap 202 covers substantially all of cover glass 108 when flap 202 is placed in contact with cover glass 108 as shown in FIG. 3A. In this way, the flap 202 can be used as a protective cover to protect aspects of electronic device 100. Flap 202 can be formed of various materials such as plastic, cloth, and so forth. Since protective cover 200 can be easily attached directly to the housing 102 without fasteners, flap 202 can essentially conform to the shape of tablet device 100. In this way, the cover 200 will not detract or otherwise obscure the look and feel of tablet device 100. Flap 202 can be unitary in nature or flap 202 can be segmented in such a way that a segment of the flap can be lifted to expose a corresponding portion of the display. The number and size of the segments can be widely varied. Flap 202 can also include functional elements that can cooperate with a corresponding functional element in electronic device 100. In this way, manipulating flap 202 by, for example, lifting flap 202 (or a foldable segment thereof) away from (or towards) a corresponding sensor can result in an alteration in the operation of tablet device 100.

Flap 202 can include magnetic material. For example, magnetic elements 210 can be used to magnetically attach to corresponding magnetic attachment system 20 whereas magnetic element 212 can be detectable by Hall Effect sensor 116 when flap 202 is in position above cover glass 108. In this way, Hall Effect sensor 116 can respond by generating a signal that can be interpreted as information that can be used by a processor. The information can be used as cover positional information by the processor, for example, to determine a relative spatial position of flap 202 and tablet device 100. The relative spatial position can be used to alter an operating state of tablet device 100. Hall Effect sensor 116 (in the form of a linear Hall Effect sensor) can be used to determine any dynamic changes in the detected magnetic field indicative of movement of the magnet and tablet device 100 such as angular displacement of magnetic element 212 in relation to Hall Effect sensor 116. In some embodiments, flap 202 can include more than one magnetic element 212 positioned in such a way as to be detectable by corresponding HFX sensors 116 disposed in tablet device 100. In this way, information related to folding of a segmented version of cover 200 can be relayed to and used by tablet device 100. For example, by staggering the respective positions of HFX sensors 116 and magnetic elements 212 spatial relationship information between cover 200 and tablet device 100 can be deduced.

Cover 200 can include other magnets in the form of magnetic array 214. Magnetic array 214 can also be configured to convey information to tablet device 100 for example, when tablet device 100 includes multiple HFX sensors that can detect magnetic array 214. In this way, information in the form of a magnetic code can be provided to tablet device 100. For example, if magnetic array 214 includes four magnets, then four corresponding HFX sensors 116 can associate information with the presence or absence of a particular magnet in magnetic array 214. In this way, an appropriately configured magnetic array pattern can represent information such as a color or style of protective cover 200.

Flap 202 can include other types of passive elements 216 in addition to magnets that can take the form of capacitive elements 216 that can be detected by a multi-touch (MT) sensitive layer incorporated in display assembly when flap 202 is placed upon cover glass 108. In this way, the MT sensitive layer can respond to the presence of capacitive elements 216 by generating a touch pattern consistent with the defined pattern. The defined pattern can be used to convey information to tablet device 100. The information can include, for example, aspects and characteristics of protective cover 200 such as color, type, style, serial number, and so forth. In addition to passive elements, flap 202 can include active elements 218 such as RFID device 218 that can be used to identify protective cover 200. In particular, when protective cover 200 is in the closed configuration, flap 202 can be in contact with cover glass 108 thereby allowing a RFID sensor within tablet device 100 to "read" RFID device 218. In this way information about cover 200, such as an identification of a serial number, style, date and place of manufacture, authentication code of protective cover 200, can also be retrieved.

Protective cover 200 can also include features that can be detectable by optical sensors such as ALS or camera assembly. For example, micro-perforations 220 can be formed in protective cover 200 that can permit selected amounts of light to penetrate protective cover 200 in the vicinity of ALS 112 or camera assembly 110. Micro-perforations 220 can be arranged in a pattern that can convey information to tablet 100. For example, micro-perforations 220 can be configured in a bar code arrangement that can provide information in the form of a specific light signal.

Figure 3B:
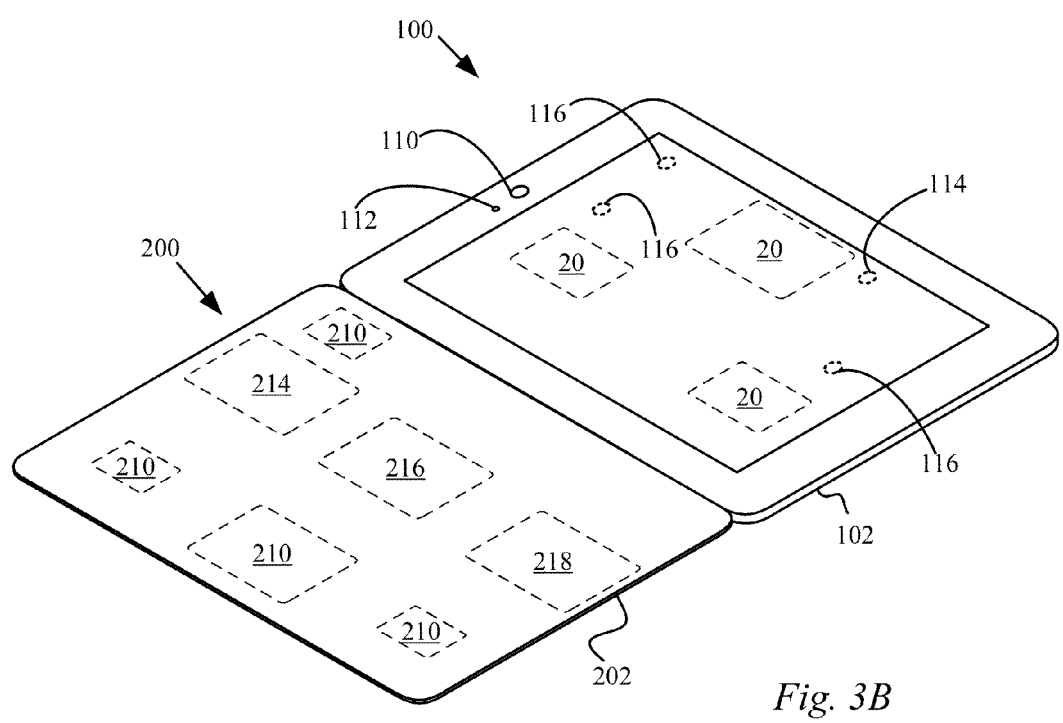
FIG. 3B shows an open configuration of the cooperating system shown in FIG. 3A.

Although FIGS. 3A and 3B show protective cover 200 and tablet device 100 magnetically attached to each other where any form of attachment between flap 200 and tablet device 100 is possible. For example, protective cover 200 can be formed of a sleeve portion pivotally coupled to flap 202. In this way, tablet device 100 can be inserted into the sleeve portion and flap 202 can then pivot to open and closed configurations without the need for magnetic attachment. However, for the remainder of this discussion and without loss of generality, it is presumed that protective cover 200 and tablet device 100 are magnetically attached to each other.

FIG. 3A shows a magnetic attachment embodiment in which protective cover 200 is in a closed configuration such that cover glass 108 is fully covered by and in contact with flap 202. Protective cover 200 can pivot about hinge assembly 206 from the closed configuration of FIG. 3A to an open configuration of FIG. 3B. In the closed configuration, inner layer of flap 202 can come in direct contact with cover glass 108. In this way, passive elements 208 can be detected by a corresponding detection circuit disposed in tablet device 100. For example, if passive elements 208 include capacitive elements, then a multi-touch (MT) circuit disposed within the display assembly beneath cover glass 108 can detect and "read" capacitive elements 216. In this way, capacitive elements 216 can be used to convey information about protective cover 200. For example, information encoded in a pattern of capacitive elements 216 can be detected by the MT circuit and information passed to the processor. The processor, in turn, can read the pattern of capacitive elements 216 as a signature that can be used to identify various characteristics of protective cover 200. The patterns can be widely varied. A first pattern can maximize a difference in capacitive signal between any two adjacent capacitive elements in order to maximize a signal to noise ratio and thereby improve the reading ability of the MT circuit.

For example, capacitive elements 216 can take the form of metallic strips placed diagonally with respect to a Cartesian detection grid disposed beneath cover glass 108. In this way, by associating a specific information element (such a binary "1") with a particular orientation, a correlated pattern of metallic strips can be used to passively convey information to the processor in tablet device 100. It should be noted, however, that the need to maximize a differential signal between adjacent capacitive elements can be achieved by varying not only the orientation, but size, shape, material (by varying the electrical properties of the various capacitive elements) and so forth.

Figure 4:
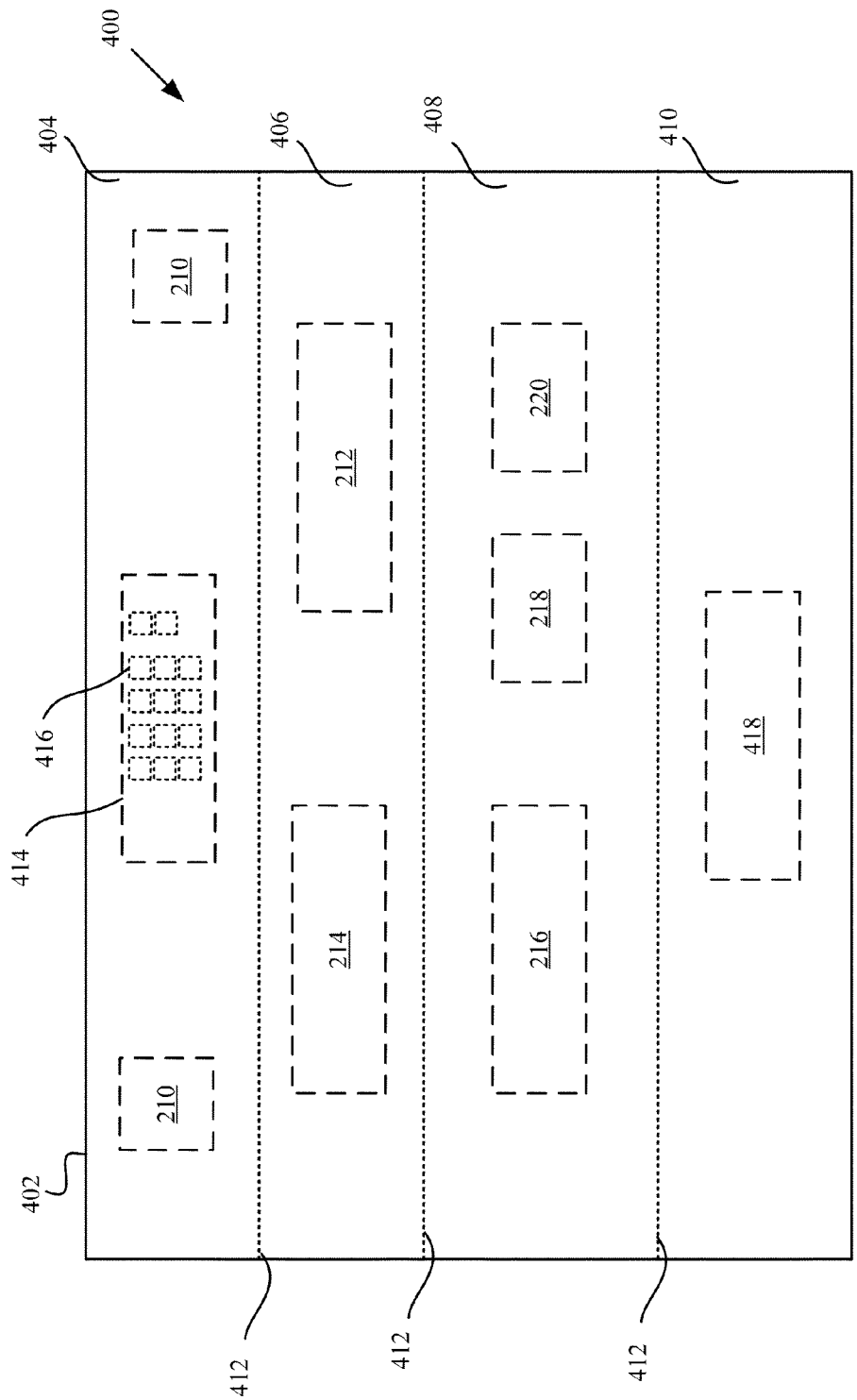
FIG. 4 shows a top view of an embodiment of a segmented cover assembly.
Figure 5:
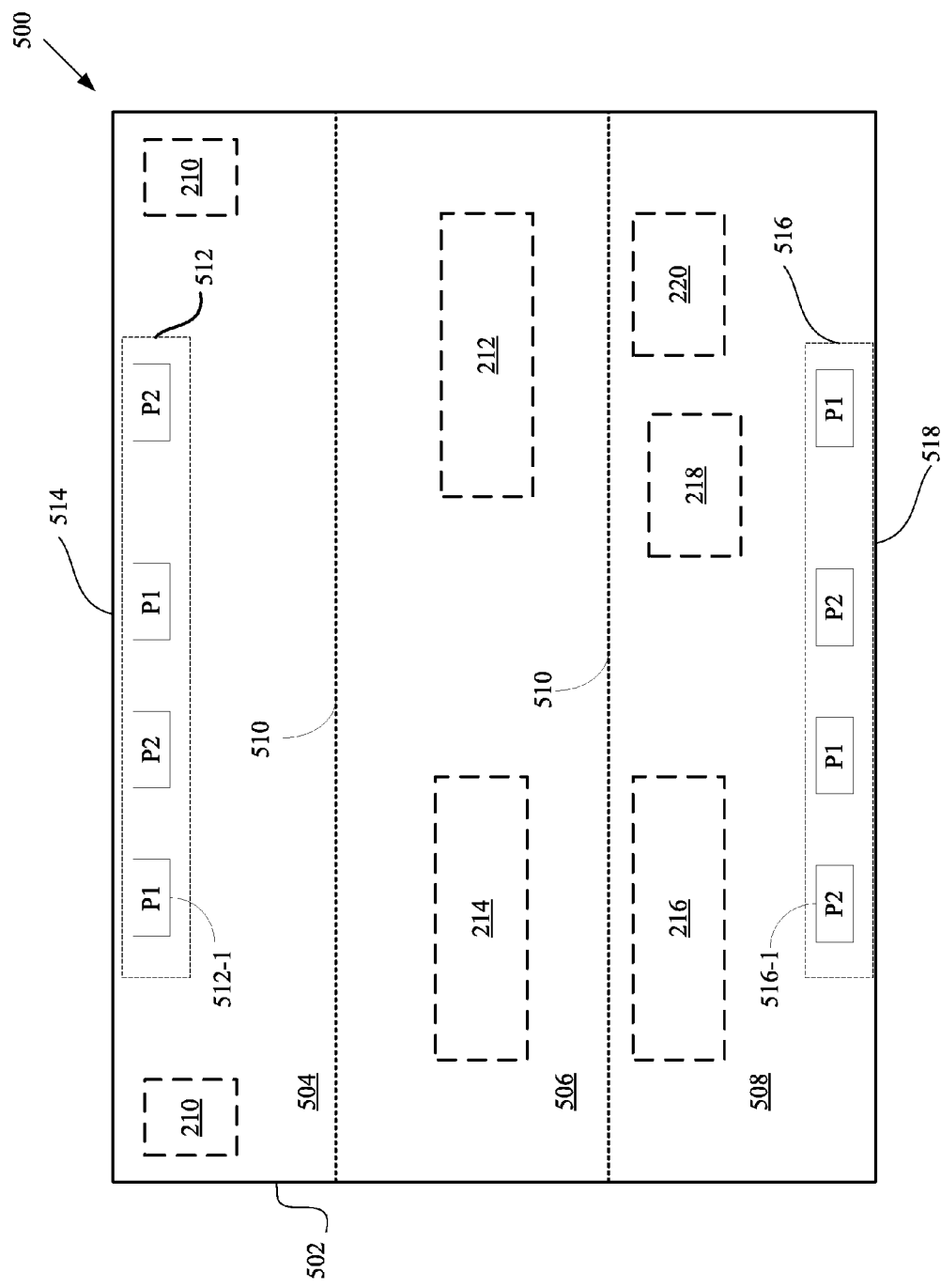
FIG. 5 shows a top view of another embodiment of protective cover 200 in the form of cover assembly.

FIG. 4 shows a top view of a specific embodiment of protective cover 200 in the form of segmented cover assembly 400. It should be noted that the number of segments can be widely varied. For example, as shown in FIG. 4, the number of segments is four. However, in other embodiments (as shown in FIG. 5, for example) the number of segments can be three while in other embodiments (such as FIG. 2) the number of segments can be one (i.e.; unitary flap).

Cover assembly 400 can include body 402. Body 402 can have a size and shape in accordance with cover glass 108 of tablet device 100. Body 402 can be formed from a single piece of foldable or pliable material. Body 402 can also be divided into segments separated from each other by a folding region. In this way, the segments can be folded with respect to each other at the folding regions. In one embodiment, body 402 can be formed layers of material attached to one another forming a laminate structure. Each layer can take the form of a single piece of material that can have a size and shape in conformance with body 402. Each layer can also have a size and shape that correspond to only a portion of body 402.

In a specific embodiment, segmented body 402 can be partitioned into a number of segments 404-410 interspersed with thinner, foldable portions 412. Each of the segments 404-410 can include one or more inserts disposed therein (not shown) that can be formed of rigid or semi-rigid material adding resiliency to body 402. Examples of materials that can be used include plastics, fiber glass, carbon fiber composites, metals, and the like. Segment 404 can accommodate magnetic attachment system 414. Magnetic attachment system 414 can include magnets 416 some of which can interact with magnets in table device 100 and more specifically with magnets 22 in attachment feature 20. Magnets 416 can magnetically interact with magnets 22 to secure cover 400 to tablet device 100. However, magnets 416 can also be used to form a triangular support structure by forming a magnetic circuit with magnetically attractable element 418. In one embodiment, magnets 22 can be arranged in a magnetic array along the lines of a Halbach array in order to enhance a magnetic field from magnets 416. The enhanced one sided nature of the magnetic field provided by the Halbach array is well suited for enhancing magnetic attraction. For example, magnets 416 arranged as a Halbach array can pass substantially more magnetic flux to magnetic element 418 and essentially no magnetic flux passing through an exterior surface of cover 400. In this way, magnetic attracting force between magnets 416 and magnetically attractable element 418 can be commensurably increased while eliminating any magnetically related affects external to cover 400.

Cover 400 can also include magnetic elements 210 that can be used to magnetically attach to corresponding magnetic attachment system 20 to reduce racking of cover 400 when attached to tablet device 100. Cover 400 can also include magnetic element 212 that can be used to activate Hall Effect sensor 116 when flap 402 is in position above cover glass 108. Cover 400 can also include passive or active elements that complement sensors disposed within tablet 100. For example, cover 400 can include magnetic array 214 that can be configured to convey information to tablet device 100 for example, when tablet device 100 includes multiple HFX sensors that can detect magnetic array 214. In this way, information in the form of a magnetic code can be provided to tablet device 100. Cover 400 can also include passive elements 216 (such as capacitive elements 216) that can be read by capacitive based multi-touch circuitry disposed within tablet 100. Cover 400 can also include active elements such as RFID based elements 218. In addition, cover 400 can be configured to include light transmitting features that can provide a light signal to camera assembly 110 or ALS 112. Light transmitting features can include patterned micro-perforations that pass light in a pattern that can be read by camera assembly 110 or ALS 112.

FIG. 5 shows a top view of another embodiment of protective cover 200 in the form of cover assembly 500. Cover assembly 500 can include body 502. In the embodiment shown in FIG. 5, segmented body 502 can be partitioned into three segments, segments 504, 506, and 508 each coupled to an adjacent segment by thinner, foldable portions 510. Each of the segments 504-508 can include one or more inserts disposed therein that can be used to provide structural support for segmented body 502. That is, the inserts can provide stiffness to the cover assembly. In some cases, the inserts may be referred to as stiffeners. As such, cover assembly 500 is relatively stiff except along the foldable regions that are thinner and do not include the inserts (e.g., allows folding) making segmented cover assembly 500 more robust and easier to handle. In one embodiment segments 504, 506, and 508 can have a size relationship to each other such that a segments 504-508 can be used to form a triangular support structure.

In one embodiment, segmented body 502 can include a number of magnets some of which can be used to form the triangular structure. For example, segment 504 can include first edge attach magnets 512 linearly arrayed along first edge 514 of segmented body 502 whereas segment 508 can include second edge attach magnets 516 linearly arrayed along second edge 518 opposite to first edge 514. In this embodiment, first edge attach magnets 512 and second edge attach magnets 516 have a one to one correspondence in which each first edge attach magnet 512 can be associated with a corresponding one of second edge attach magnets 516. For example, first edge attach magnet 512-1 can have polarity P1 that can be associated with second edge attach magnet 516-1 having polarity P2 where first edge attach magnet 512-1 and second edge attach magnet 516-1 are about the same size and magnetic strength. In this way, the triangular structure can be formed without the need for a separate magnetically attractable element (such as magnetically attractable element 418) since the triangular structure can be formed using a magnetic edge attach technique. The magnetic edge attach technique relies upon the first and second edge attach magnets when brought into proximity with each other (and not necessarily overlaying each other) to form a magnetic circuit. The magnetic circuit can provide a suitable magnetic attractive force to maintain the triangular structure in a proper configuration.

Cover 500 can also include magnetic elements 210 that can be used to magnetically attach to corresponding magnetic attachment system 20 to reduce racking of cover 500 when attached to tablet device 100. Cover 500 can also include magnetic element 212 that can be used to activate Hall Effect sensor 116 when body 502 is in position above cover glass 108. Cover 500 can include magnetic array 214 that can be configured to convey information to tablet device 100 using, for example, multiple HFX sensors that can detect magnetic array 214. Cover 500 can include other passive elements such as capacitive elements 216 that can be read by capacitive based multi-touch circuitry disposed within tablet 100. Cover 500 can also include active elements such as RFID based elements 218 and as with cover 400, cover 500 can be configured to include light transmitting features (such as patterned micro-perforations) that can provide a light signal to camera assembly 110 or ALS 112.

Figure 6A:
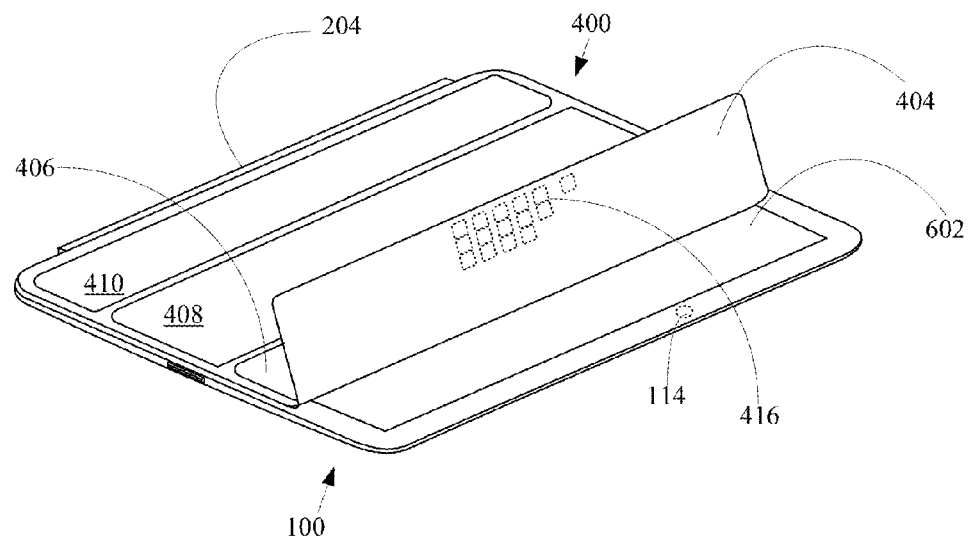
FIG. 6A and FIG. 6B shows a segmented cover in partial open configurations with respect to a tablet device and FIG. 6C shows a segmented cover in a partial open configuration.
Figure 6B:
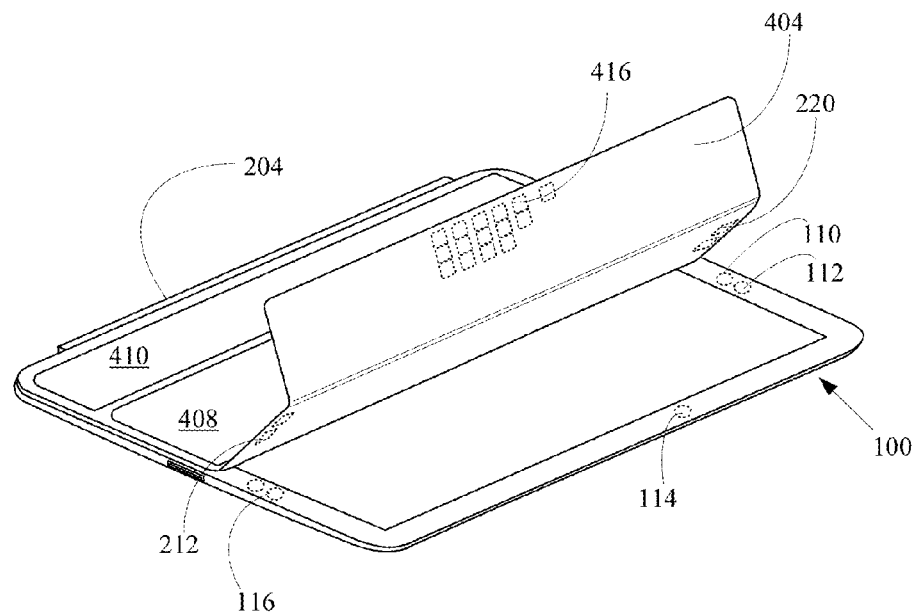
Figure 6C:
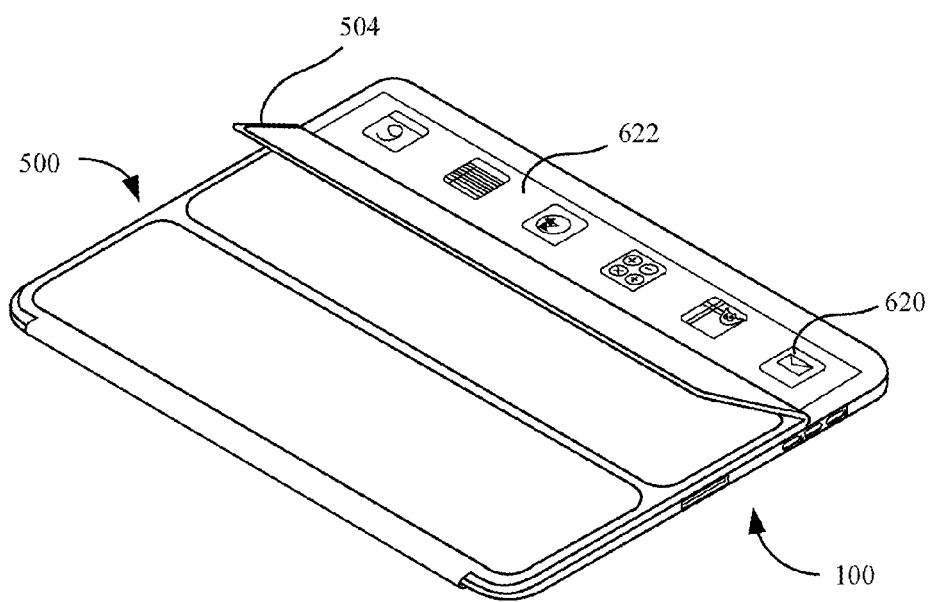

FIG. 6A and FIG. 6B shows segmented cover 400 in partial open configurations with respect to tablet device 100 whereas FIG. 6C shows segmented cover 500 in a correspondingly similar partial open configuration. It should be noted that the following describing cover 400 can also be applied to cover 500 since both are foldable and have multiple segments. By partial open configuration it is meant that due to the segmented nature of segmented cover 400 (or cover 500), only a portion of protective layer 108 can be exposed at a time. However, in order for tablet device 100 to operate in a suitable manner consistent with a folded configuration of cover 400, the processor in tablet device 100 must be able to accurately determine a spatial relationship between cover 400 and tablet device 100 in real time.

For example, as shown in FIG. 6A, in those situations where HFX sensor 116 cannot detect a magnetic field from magnets 416, there are three spatial relationships between cover 400 and tablet device 100 consistent with that scenario. Possible state (1) is that cover 400 and tablet device 100 are not magnetically attached to each other, possible state (2) is that cover 400 is magnetically attached to tablet device 100 but in a fully open configuration, or possible state (3) is that cover 400 is attached to tablet 100 and in at least a first partially open, or first peek mode state. Therefore, in order to resolve this problem, other sensors and their associated data can be used. For example, in order to resolve possible state (1), a determination can be made if magnetic compass 114 is experiencing a magnetic offset consistent with that expected when magnetic attachment system 104 is active. This magnetic offset can be due to magnets in tablet device 100 as well as the presence of magnets in magnetic attachment system 204. If the magnetic offset is consistent with no attachment (i.e., a baseline magnetic offset) then the situation has been resolved to configuration state (1), namely no magnetic connection and the processor can cause tablet device 100 to operate accordingly (the display assembly is fully viewable and can fully present visual content over its entire display area). Other sensors can also be used to help resolve the connection status of tablet device 100. The other sensors can include a HFX sensor disposed in proximity to magnetic attachment system 104 as well as sensors (such as a linear Hall Effect sensor, tact switch, etc.) that can resolve movement of movable magnetic elements in magnetic attachment systems that rely on moving magnets to transition from inactive to active state.

If, however, is has been resolved that tablet device 100 and cover 400 are magnetically attached to each other, then either state (2) or state (3) is still possible. In order to resolve this situation, additional sensors and the associated data can be used. For example, if ALS 112 or camera assembly 110 cannot detect a least a minimum amount of light, then it can be precluded that the segment 406 (or segment 506 in cover 500) is blocking the light and therefore remains in position overlaying a corresponding portion of cover glass 108. Therefore, the processor can deduce that only segment 404 is lifted and exposing corresponding portion 602 of cover glass 108 in what can be referred to as first peek mode. Other sensors that can be used include additional Hall Effect sensors disposed along either edges 12b or 12c of housing 12 that can detect corresponding magnets in segments 404-410. Once the processor has determined that cover 400 is in a first peek mode folded configuration, the processor can direct tablet 100 to present visual content at only portion 602 of the display assembly.

On the other hand, if ALS or camera assembly 110 can detect at least the minimum amount of light, then still other sensors can be used to resolve if cover 400 is fully open or in an extended peek mode (shown in FIG. 6B). For example, if an HFX sensor disposed in tablet device 100 can detect a corresponding magnet in segment 408, then the processor can deduce that segment 408 is in place over a corresponding portion of cover glass 108 and cover 400 is in an extended peek mode folded state along the lines of FIG. 6B. On the other hand, if the HFX sensor does not detect the magnet (or any magnet in segment 410), then the processor can deduce that cover 400 is in a fully open configuration and direct tablet device 100 to present visual content accordingly.

In addition to magnets, patterns of capacitive elements in those segments (such as segments 406, 408, 410) that remain in contact with cover glass 108 can be detected and used by the processor to resolve the folding state of cover 400. The capacitive elements in segment 406 being detected is a clear indication that segment 406 is in contact with cover glass 108. However, since HFX sensor 116 is no longer detecting the magnetic field from magnetic elements 416, the processor in tablet device 100 can deduce that only segment 404 is lifted while all other segments remain in contact with cover glass 108 and cover 400 is in the first peek mode configuration.

Using this information, the processor can alter an operating state of tablet device 100 in accordance with a folded state of cover 400. For example, the processor can display information, such as battery level, time of day, email, etc. only in that portion 602. Information detected in segment 406 can also be used by tablet device 100 to present specific visual content on portion of the display assembly that presents visual content in viewable portion 602. For example, tablet device 100 to display visual information suitable only for presentation by viewable portion 602 in a manner in accordance with available presentation resources. For example visual elements (such as icons, graphical user input, and video) can be processed in a manner in accordance with the size and number of pixels available for presentation. The visual elements can include information icons related to email received, weather conditions and so forth. In one embodiment, visual presentation resources (such as a number of pixels available for presenting video or still images) can be consistent across either cover 400 or cover 500. For example, in order to provide a consistent user experience, the size of segment 404 and segment 504 can be such that in the first peek mode, that the same number of pixels are available as presentation resources. In this way, tablet device 100 is not required to comprehend a particular configuration (3 fold or 4 fold) to present visual content in the first peek mode.

FIG. 6B shows another partially open situation where in addition to segment 404, segment 406 has also been lifted. The determination that only segments 404 and 406 can be ascertained when it is determined in one embodiment that capacitive elements 216 in segment 406 are no longer detected whereas capacitive elements 216 in segment 408 can be detected. In this way, additional display resources can be enabled to provide an enhanced display experience. In addition to using capacitive elements, other sensors can be brought into play. For example, ALS 112 and camera assembly 110 can be used separately or in combination to determine that segment 408 has been lifted based upon amounts of ambient light detected (in the case of ALS 116) and/or periodic image capture events by camera assembly 112. As discussed above, a magnetometer can be used to determine the attachment state (active or inactive) of magnetic attachment system 104. In this way, the processor can use this information to distinguish between peek and extended peek mode. In still another embodiment, elements 604 can be placed on the periphery of segmented cover 400 at selected locations that correspond with detection nodes in tablet device 100. In this way, the ability to detect elements 604 by the detection nodes can provide a further indication of the status of segmented cover 400 in relation to tablet device 100.

As shown in FIG. 6C, as discussed above, in the first peek mode, tablet device 100 can present visual content in the form of icons 620. Hence, information in the form of visual content such as time of day, notes, and so forth can be presented for viewing on only that portion of display viewable. Once the sensors detect that segment 506 has been placed back on glass layer 108, tablet 100 can return to the previous operational state such as a sleep state. Furthermore, in another embodiment, when an icon arranged to respond to a touch is displayed, then that portion of a touch sensitive layer corresponding to the visible portion of the display can also be activated. As above, the amount of visual presentation resources (pixels, etc.) can be the same for both tablet device 100 when used with cover 400 or cover 500. In other words, the size of segments 404 and 504 are such that the amount of visual presentation resources corresponding to portions 602 and 622 are about the same.

Figure 7A:
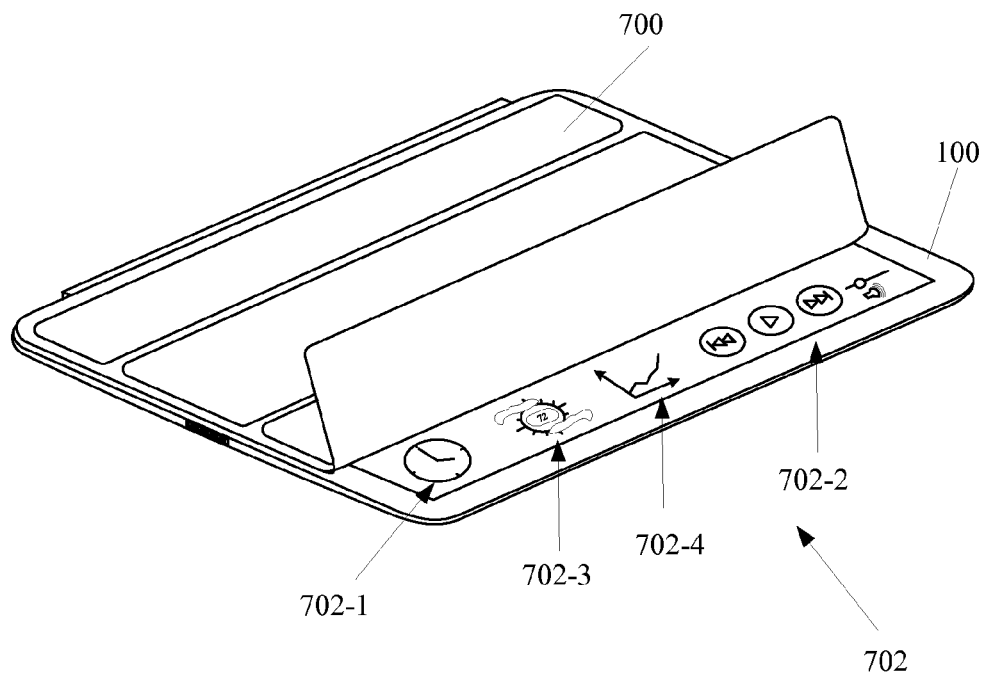
FIGS. 7A and 7B illustrates tablet device in a first peek mode and a second peek mode, respectively, in accordance with the described embodiments.
Figure 7B:
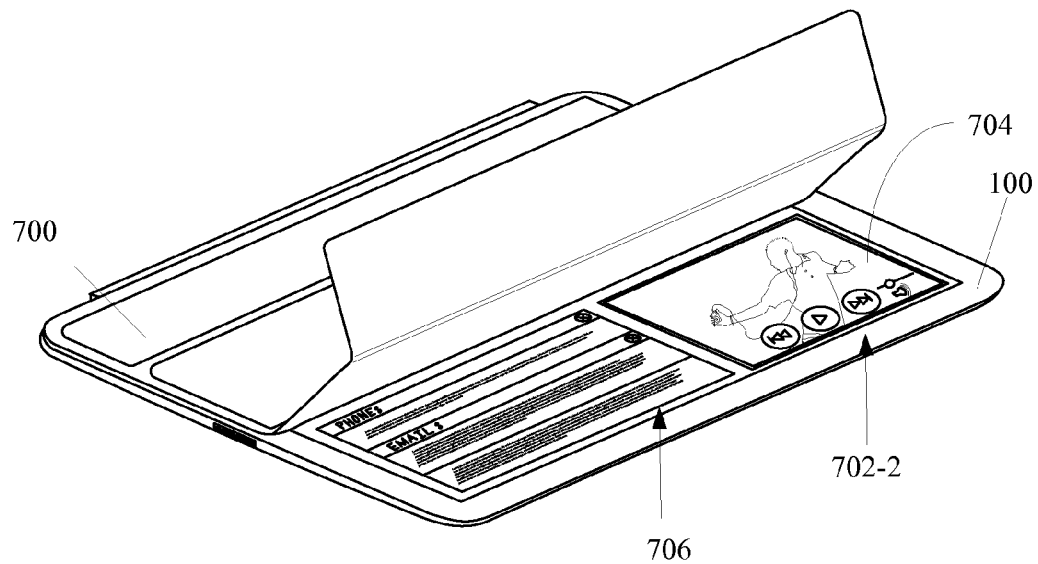

FIG. 7A illustrates tablet device 100 operating in the first peek mode when selected icons 702 or other visual elements can be displayed only in viewable portion 704 of display 16 of tablet device 100. Icons 702 can be simply display type icons or in some instances, some or all of icons 702 can be user interactive. For example, icon 702-1 can display a clock showing the current time whereas icon 702-2 can represent graphical user interfaces used to modify operations of a media player function performed by tablet device 100. Other icons can include, icon 702-3 representing current weather conditions, icon 702-4 representing a stock market result, and so on. FIG. 7B, on the other hand, illustrates second peek mode in which additional functionality can be enabled when it is determined that more than a pre-determined amount of display 16 is viewable. In this mode, additional information available in portions of protective cover 700 in contact with display 16 can cause tablet device 100 to alter its operating state along the lines disclosed. For example, in an advanced peek mode, an additional display area that is viewable can be used to present video 704 (with overlaid user interface 702-2 or equivalent), textual data 706 and so on.

It should be noted that icons and iconic behavior can be modified in accordance with an amount of viewable display. For example, a notification icon can be presented indicating that the tablet device is operating in peek or associated mode. In addition, properties of an icon in the form of a graphical user interface, or GUI, for example, can be related to the amount of display that is viewable. For example, in a first peek mode, the size of a GUI can expand or contract depending upon an amount of display that is viewable. Moreover, other properties such as number of pixels, pixel density, placement in a visual field, and so on can be related to peek mode as well as the speed of peek mode. By speed of peek mode it is meant that the time it takes for the tablet device to alter its operating state to a corresponding peek mode state. In one example, as a portion of the cover is lifted, visual content presented at the display can track the cover as it is lifted going from first peek mode, to second peek mode (if the lifting is continuous) and all the way to fully open all during a continuous movement of the cover.

Figure 8:
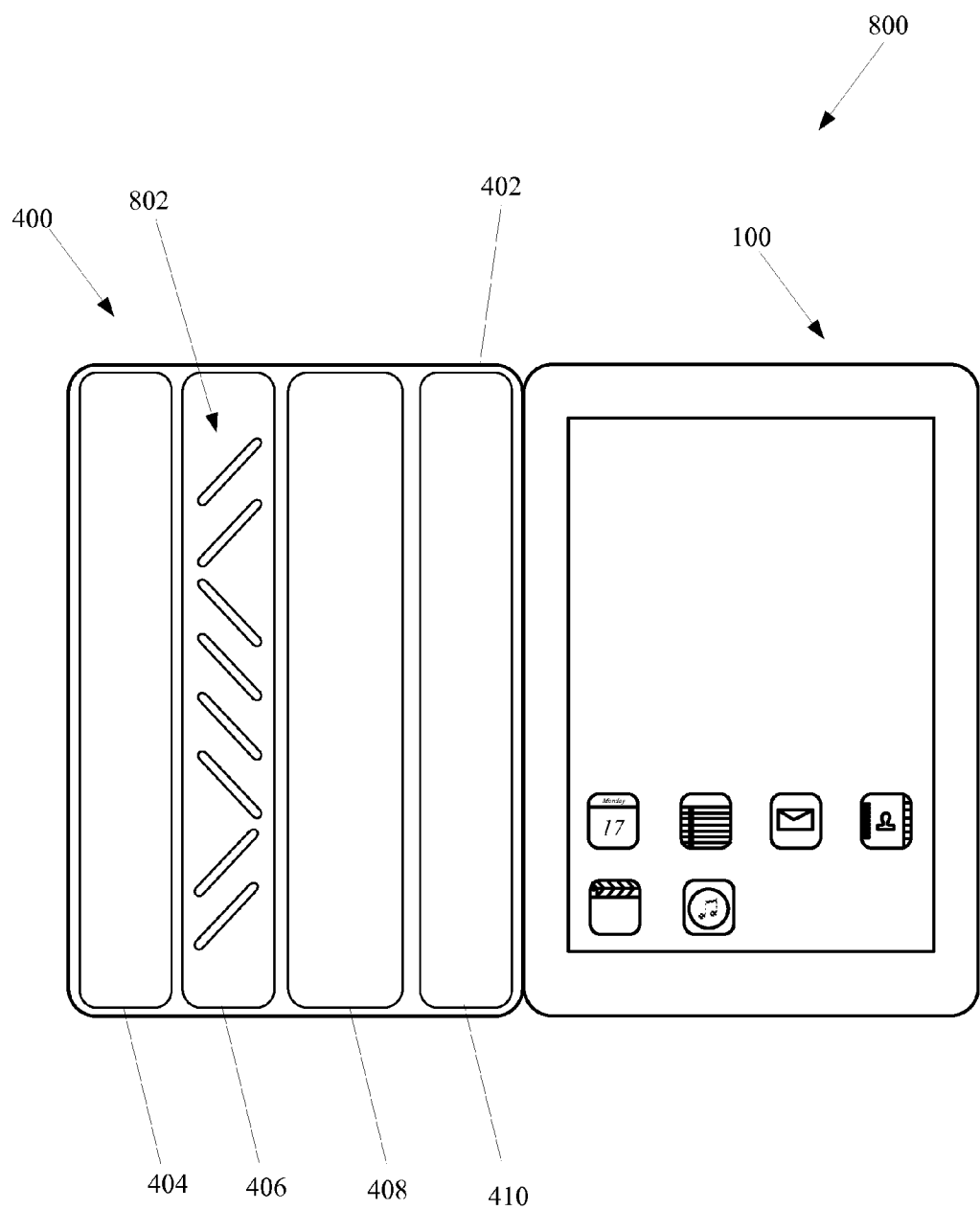
FIG. 8 shows system that includes protective cover pivotally coupled to tablet device in accordance with the described embodiments.

FIG. 8 shows system 800 that includes protective cover 400 pivotally coupled to tablet device 100 in accordance with the described embodiments. In this embodiment, at least one segment 404-410 can include passive elements 216 that can take the form of capacitive elements arranged in various patterns. Each pattern can encode information in the form of data. For example, when detectable by an MT circuit in tablet device 100, an alternating diagonal arrangement of capacitive elements can maximize a signal to noise ratio. In this way, capacitive elements 802 can be conductive in nature and can take the form of metallic strips (formed of, for example, aluminum) that are incorporated into segment 404 in an alternating diagonal pattern in relation to detection nodes in tablet device 100 in order to maximum the reliability of detection. For example, at least some of diagonal metallic strips 802 can be arranged at about 45° in relation to a capacitive detection grid disposed in tablet device 100. The capacitive elements can vary from one segment to another and even vary from within each segment. In this way, information can be encoded in any number of different ways by using various configurations of capacitive elements.

Figure 9:
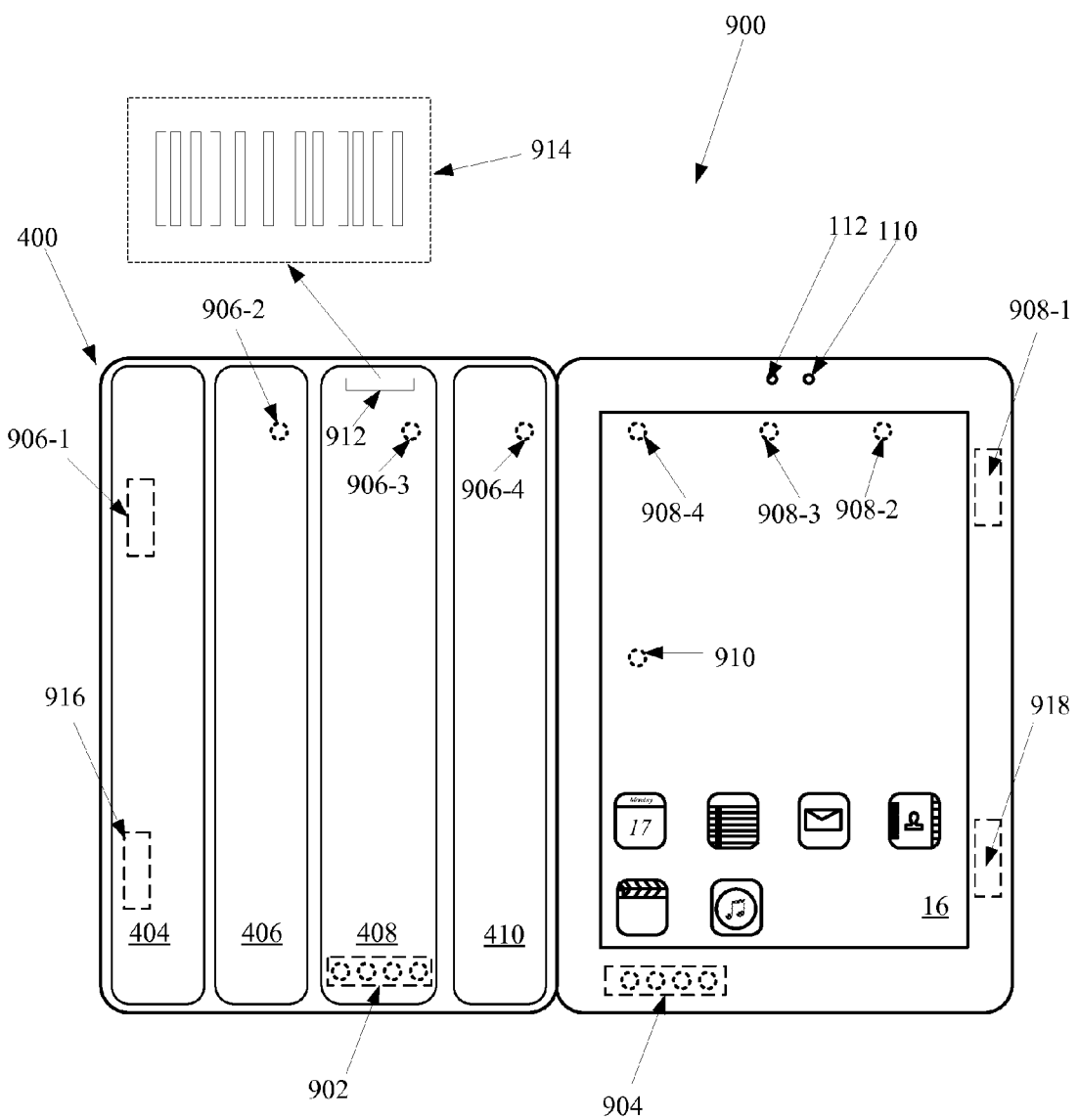
FIG. 9 shows system being a more generalized version of system 800 in which various information elements are shown.

FIG. 9 shows system 900 being a more generalized version of system 800 in which various information elements are shown. For example, cover 400 can include magnetic array 902 arranged in a pattern that can be detected by magnetic sensors 904 disposed in tablet device 100. Magnetic array 902 can encode information that can be used to identify various aspects of cover 400. For example, when magnetic sensors 904 can resolve a magnetic field from each member of magnetic array 902, then at least 4 units of information can be encoded. For example, if magnetic array 902 include 3 magnets in positions first, second and fourth positions, then the detection of a magnet by a corresponding one of magnetic sensor 904 can be resolved as an information unit (such as "1"). In this example, magnetic array 902 having magnets in first, second, and fourth positions can be resolved by magnetic sensors 904 as data word {1,1,0,1} that can be used to identify four information states related to cover 400 (such as color, style, etc.). In some cases, additional information states can be encoded if magnetic sensors 904 can resolve magnetic polarities of each of magnetic array 902. In still other embodiments, the relative magnetic field strength of the constituent magnets in magnetic array 902 can also be used to encode information.

Positional information can be provided by arranging elements (such as magnets) in such a way as to be detectable by corresponding sensors disposed in tablet device 100. For example, when magnets are positioned in one or more of segments 404-410, then sensors disposed in tablet device 100 can detect a corresponding one of magnets when that segment incorporating the magnet overlays cover glass 108. In this way, tablet device 100 can use this information to resolve a spatial relationship between cover 400 and tablet device 100. For example, if Hall Effect sensor 908-1 does not detect magnet 906-1, and Hall Effect sensor 908-2 does detect magnet 906-2, then tablet device 100 can deduce that cover 400 is in a first partially open configuration where only segment 404 is folded away from cover glass 108. Similarly, when sensor 908-3 cannot detect magnet 906-3 but an attachment sensor (such as sensor 910) confirms that tablet 100 and cover 400 are attached to each other, then tablet device 900 can deduce that cover 400 is in an extended folded configuration where segments 404, 406 and 408 are folded away from tablet 100. In this configuration, tablet device 100 can operate in an extended peek mode by presenting visual content the viewable portion of the display assembly (that portion of the display that is overlaid by segments 404-408 when cover 400 is in a fully closed configuration).

In addition to detecting magnets in cover 400, magnetic sensor 910 can be used to detect a state of magnetic attachment system. For example, if tablet device 100 has a magnetic attachment system that uses movable magnetic elements, then magnetic sensor 910 can detect a current local magnetic environment. The processor in tablet device 100 can determine if the current local magnetic environment is consistent with the movable magnets being in an active or inactive state. If the current local magnetic environment is one consistent with the magnetic attachment system being active, then the tablet device can deduce that cover 400 is attached to tablet 100 and operate according to a folded configuration of cover 400.

Additional resources can include optical resources 912. In one embodiment, optical resources 912 can take the form of a pattern of micro-perforations that can allow light to pass through cover 400 to reach either or both of camera assembly 110 and ALS 112. This pattern can take the form of, for example, bar code 914 that can encode information related to cover 400. Still further, active elements such as RFID tag 916 can be detected by corresponding circuitry 918 disposed in tablet device 100.

Figure 10:
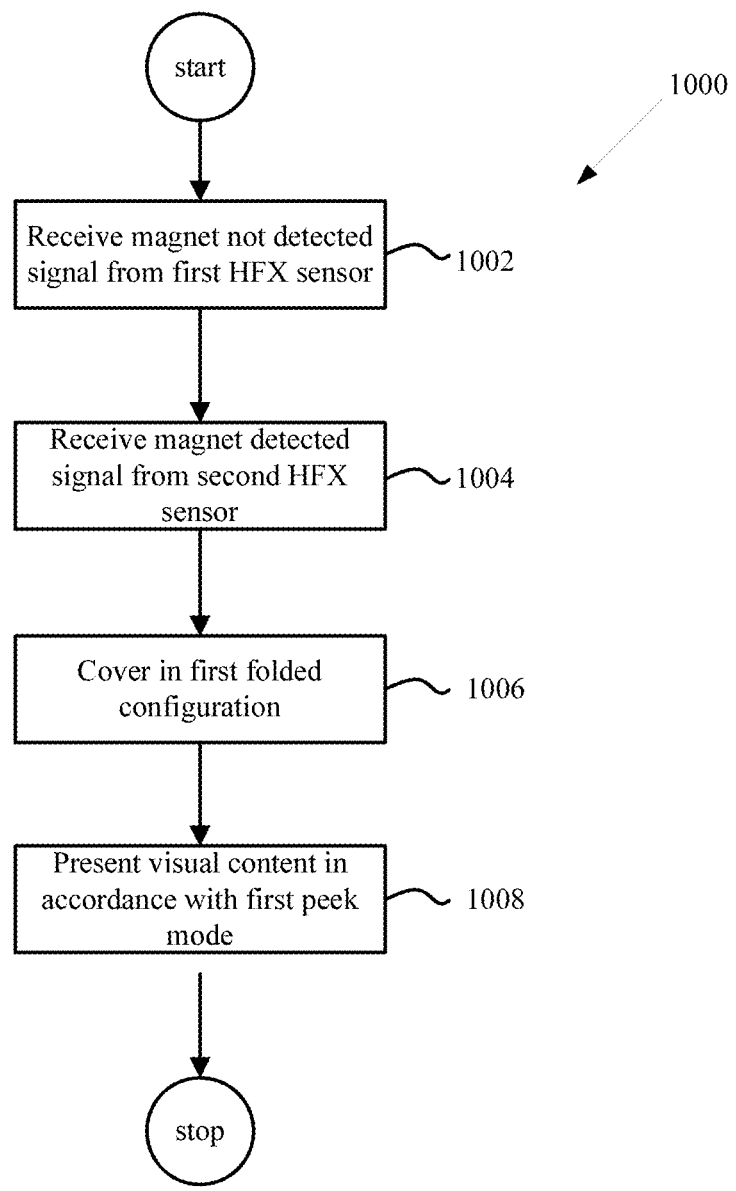
FIG. 10 shows a flowchart detailing process in accordance with the described embodiments.

FIG. 10 shows a flowchart detailing process 1000 in accordance with the described embodiments. Process 1000 can be performed by receiving at a tablet device a no magnet detect signal at 1002 from a first magnetic sensor (such as a Hall Effect sensor) indicating the magnetic sensor has not detected a magnetic field corresponding to a magnet disposed in a protective cover. At this point, the tablet device must deduce if the cover is attached and if so the folded configuration of the cover. At 1004, a magnet is detected signal is received from a second HFX sensor indicating the cover is attached. The tablet device uses the information provided by the first HFX sensor and the second HFX sensor in combination to determine at 1006 that the cover is in a first folded configuration.

The tablet device presents visual content in accordance with a first peek mode consistent with the first folded configuration of the cover at 1008.

Figure 11:
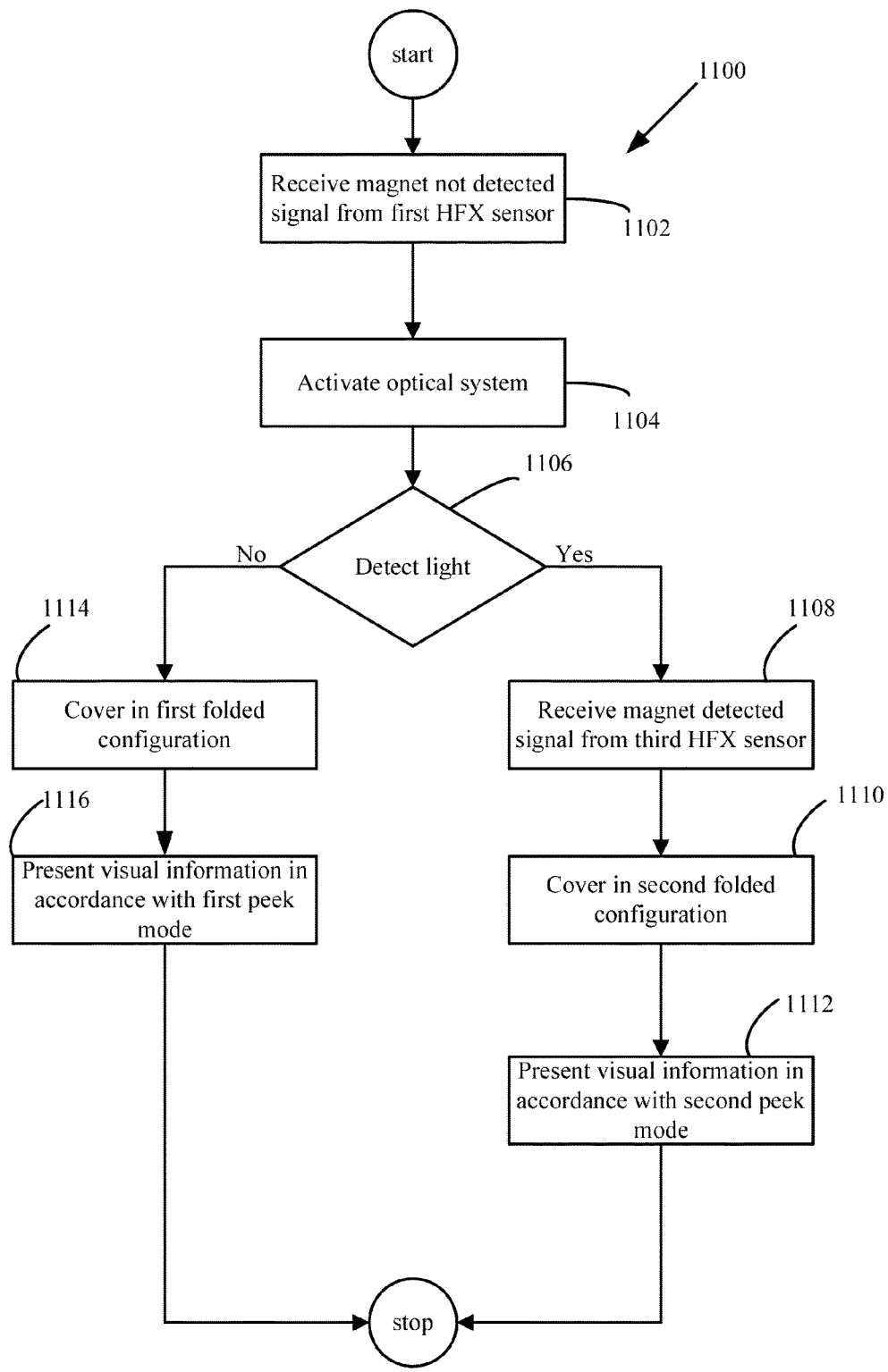
FIG. 11 shows a flowchart detailing process in accordance with the described embodiments.

FIG. 11 shows a flowchart detailing process 1100 in accordance with the described embodiments. Process 1100 can be performed by receiving a signal at 1102 from a magnetic sensor (such as a Hall Effect sensor) indicating that a magnet disposed in a cover is not detected. At 1102, the processor in the tablet device responds to the received signal by activating an optical system disposed in the tablet device at 1104. The optical system can include image capture devices such as a camera or a photo detector device such as an ambient light sensor (ALS). At 1106, a determination is made if light is detected. If at 1106, it is determined that light is detected and at 1108 a magnet is detected signal is received by the tablet device, the cover is in a second folded configuration at 1110 and the tablet device presents visual information in accordance with a second peek mode at 1112. The second peek mode being an extended peek mode in which additional portions of a display are viewable and presenting visual content.

Returning back to 1106, if the optical system does not detect light, then at 1114, the cover is in the first folded configuration and at 1116, the tablet device presents visual content in accordance with the first peek mode. It should be noted that in addition to detecting light, other embodiments describe using images on an underside of the cover that can be detectable by the optical system. In this way, the optical system can confirm that by capturing the image that at least a corresponding portion of the cover is in contact with the tablet device.

Figure 12:
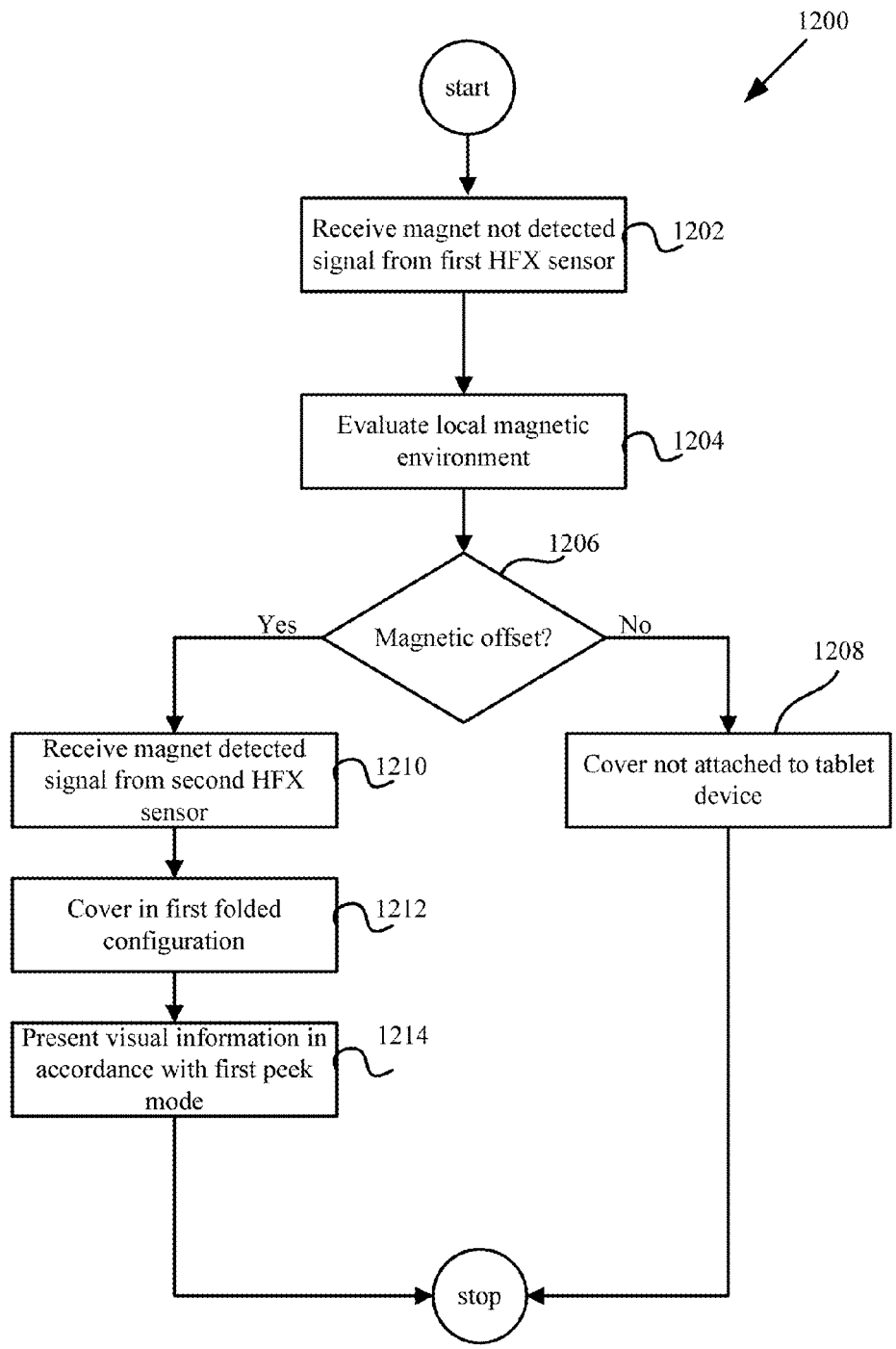
FIG. 12 shows a flowchart detailing process in accordance with the described embodiments.

FIG. 12 shows a flowchart detailing process 1200 in accordance with the described embodiments. Process 1200 can be performed by receiving magnet not detected signal from a magnetic sensor at 1202 by the tablet device. At 1204, the processor in the tablet device responds to receipt of the not detected signal by evaluating a local magnetic environment. In one embodiment, the local magnetic environment can be evaluated using a magnetometer and determining a magnetic offset value at 1206. If at 1206 a magnetic offset value is determined to be not consistent with a cover magnetically attached to the tablet device, then the cover is not magnetically attached to the tablet device at 1208 and process 1200 ends. On the other hand, if the magnetic offset is consistent with the cover being magnetically attached to the tablet device, then a magnet detected signal is received at 1210, and the cover is in the first folded configuration at 1212 and the tablet presents visual content in accordance with the first peek mode at 1214.

Figure 13:
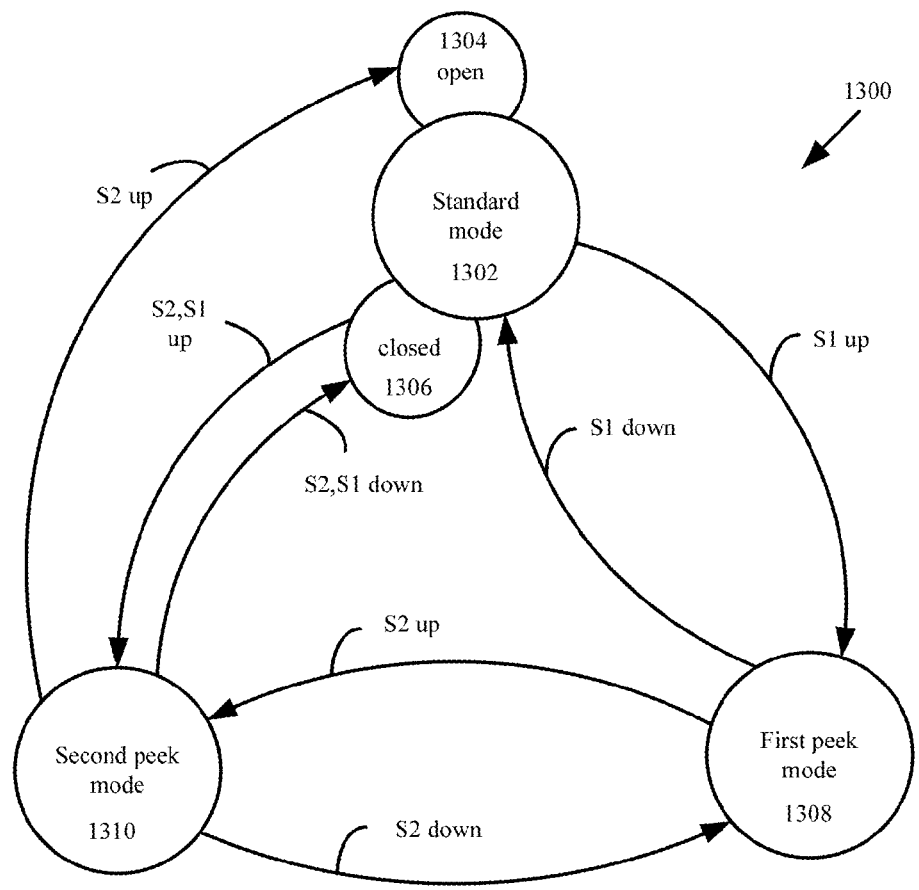
FIG. 13 shows state peek mode state diagram in accordance with the described embodiments.

FIG. 13 shows state peek mode state diagram 1300 in accordance with the described embodiments. It should be noted that although peek mode state diagram shows three tablet device operating states (standard, first peek, second peek), the number of operating states can be related in some embodiments to the number of foldable segments. For example, if n represents the number of foldable segments, then there can be n−1 peek modes available (assuming that there is adequate sensor resources for the tablet device). Moving on to FIG. 13, a tablet device can operate in a standard operating mode at 1302 when the tablet device determines that a foldable cover is in either the open configuration or the closed configuration. In the open configuration (1304), the display assembly presents present visual content without restriction. In the closed configuration (706), the display assembly is prevented from presenting any visual content.

When the tablet device is in the standard mode (1302) and a first segment (represented as "S1") is lifted, then the tablet device determines that only the first segment is lifted and changes to first peek mode operating state (1308). In the first peek mode operating state, any visual content presented by the display assembly is limited to that portion of the display assembly that is determined to be viewable consistent with the first segment being lifted. In first peek mode, when the first segment is no longer lifted from the tablet device, then the tablet device returns to standard mode (1302) and more particularly, the closed configuration. However, when the tablet device is in the first peek mode (1308) and the first segment ("S2") is determined to be lifted by the tablet device, then the tablet device changes to a second peek mode (1310). In the second peek mode, visual content is presented by the display assembly in only that portion determined to be viewable.

When the tablet device determines that the first segment is not lifted, then the tablet device transitions from the second peek mode to the first peek mode. Also, when tablet device is in the second peek mode and the tablet device determines that both segments are not lifted, then the tablet device transitions directly from second peek mode to standard mode consistent with foldable cover being in the closed configuration. Conversely, the tablet device can transition directly from the standard mode consistent with the closed configuration when first and second segments are both lifted concurrently. Also in the second peek mode, the tablet device can transition directly to the standard mode consistent with foldable cover being in the open configuration when all remaining segments of the cover are lifted.

It should also be noted, that applications can be executed in accordance with the current operating state of the tablet device. For example, an application running in first peek mode can immediately transition to a second peek mode (and vice versa). In the case of an email application, a full version of an email message can be presented in the standard mode, a smaller version (possibly just a pre-defined summation) in the second peek mode, and only a subject line in the first peek mode. It should be appreciated that a user can provide peek mode settings which can determine how tablet device responds to the cover being positioned in a manner consistent with a peek mode.

Figure 14:
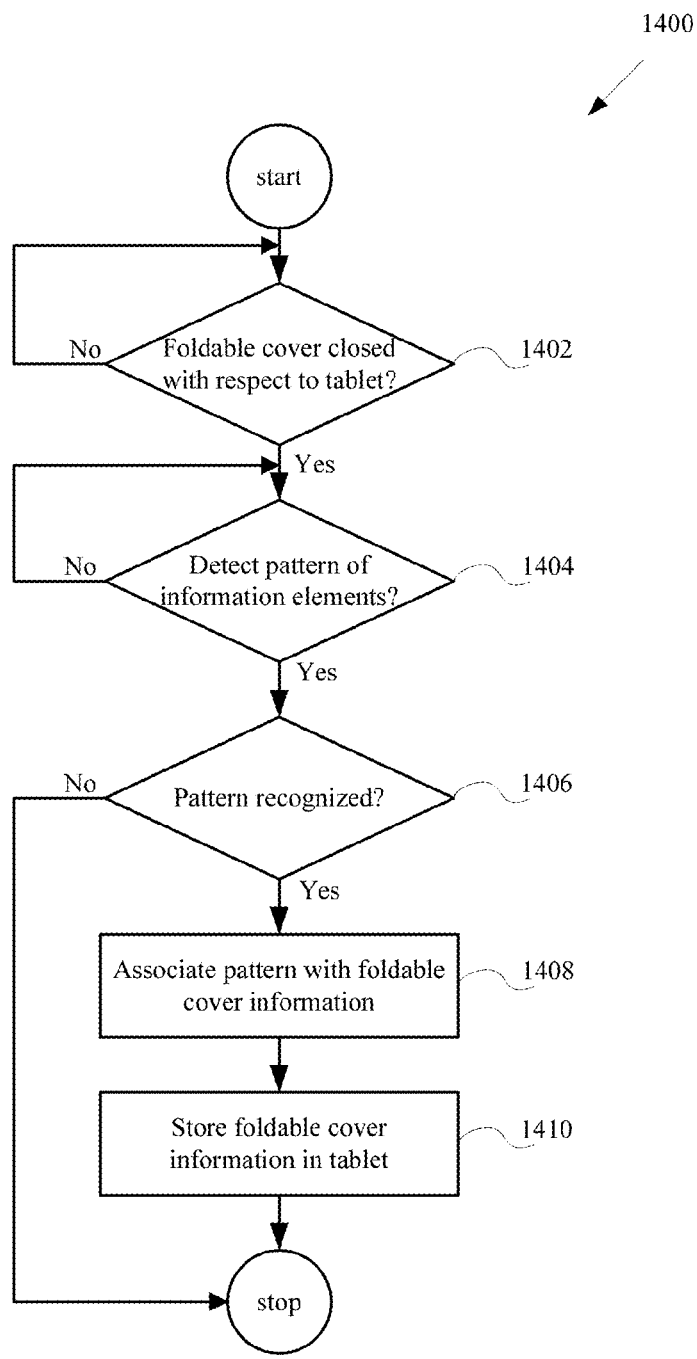
FIG. 14 shows a flowchart detailing process in accordance with the described embodiments.

FIG. 14 shows a flowchart detailing process 1400 in accordance with the described embodiments. Process 1400 can be carried out by performing at least the following operations by a tablet device associated with a foldable cover. In the described embodiment, process 1400 can start at 1402 by determining if the foldable cover is closed with respect to the tablet device. By closed it is meant that the protective cover is covering and therefore in proximity to a multi-touch (MT) detection grid disposed within the tablet device. For example, when the tablet device includes a display, the display can include MT functionality in accordance with the MT detection grid. Moreover, the determination if the cover is closed or not can be resolved in any suitable manner. For example, an optical sensor can detect the presence, or not, of the protective cover based upon an amount of light detected and based upon the amount of light deduce whether or not the foldable cover is closed or open.

In any case, once it is determined that the foldable cover is closed, a determination is made at 1404 if a pattern of information elements is detected. In one embodiment, the information elements can store information capacitively based upon size, orientation, shape, and so forth of the information elements and the MT detection grid. The pattern of information elements can, therefore, be based upon a correlation of individual characteristics of each of the information elements. For example, when the information element is a diagonal strip of aluminum, a rightward tilt can be associated with "1", whereas a leftward tilt can be associated with "0", and vice versa. When a pattern is detected, then at 1406, a determination is made if the pattern is recognized or not. When the pattern is not recognized, then process 1400 ends, otherwise, at 1408, the recognized pattern is associated with foldable cover information. The foldable cover information can include, for example, color, style, manufacture date and location, and so forth. At 1410, the foldable cover information can then be stored in a data storage device in the tablet device for future reference. For example, if part of the foldable cover information includes a serial number, then the serial number can be associated with a database of authorized foldable covers that can be periodically stored and updated in the data storage device in the tablet device. If the foldable cover serial number does not match an authorized serial number, then the presumption is that the cover is not authenticated.

Figure 15:
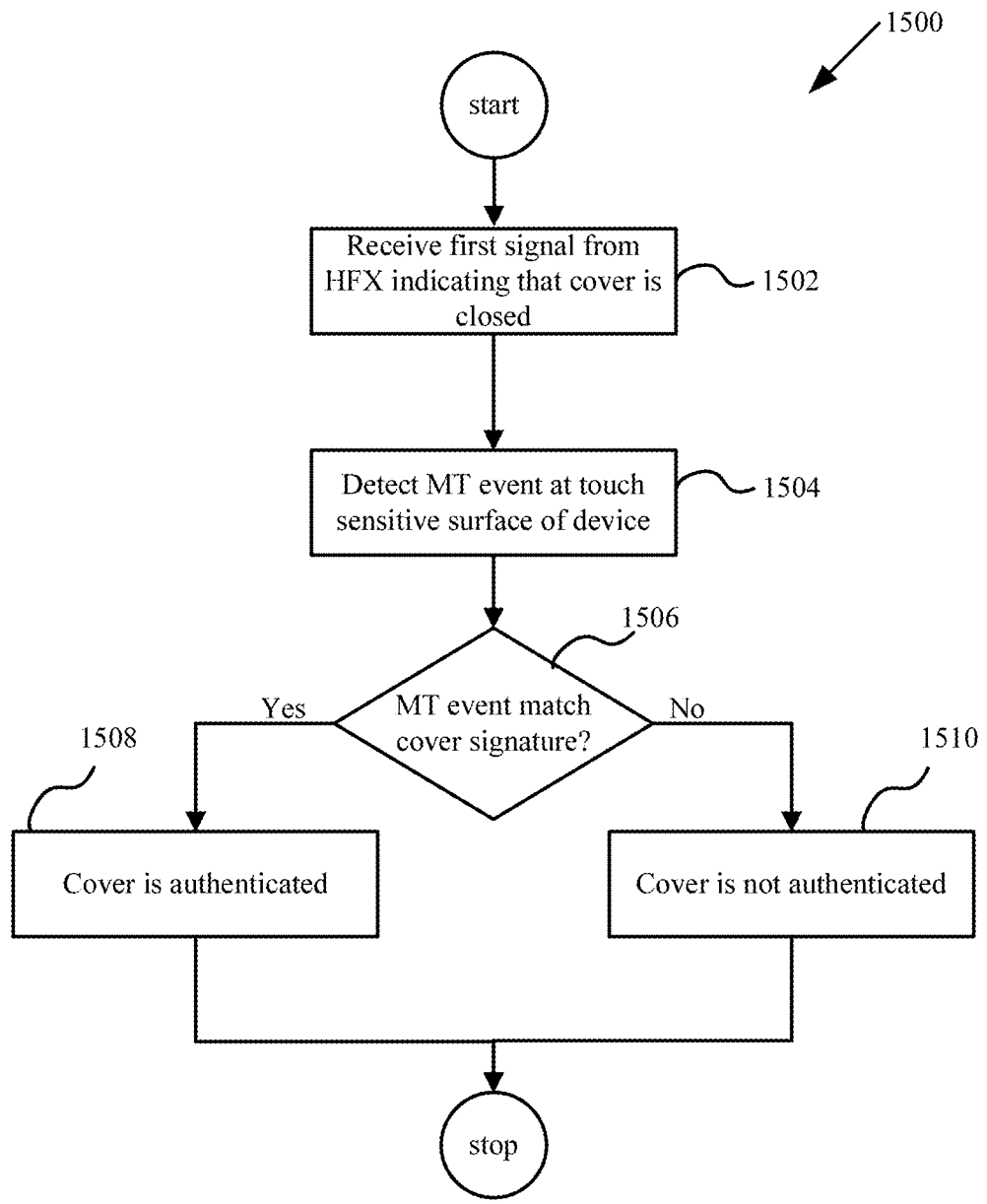
FIG. 15 shows a flowchart detailing process in accordance with a described embodiment

FIG. 15 shows a flowchart detailing process 1500 in accordance with a described embodiment that begins at 1502 when the tablet device receives a magnet detected signal from a first magnetic sensor indicating that the cover is in a fully closed configuration. More specifically, process 1500 begins at 1502 by receiving the indication from the HFX sensor that the state of the cover is closed. At 1504, a multi-touch (MT) sensor disposed in the tablet device detects a MT event. The MT event can be a result of capacitive element disposed with the cover. The capacitive elements can be arranged in a specific pattern used to encode information. At 1506, a determination is made if the information associated with the capacitive pattern corresponding to the MT event matches an signature stored in the tablet device. If the MT signature is determined to be consistent with the stored signature, then at 1108, the tablet device authenticates the cover at 1508, otherwise, the tablet device determines that the cover is not authenticated at 1510.

Figure 16:
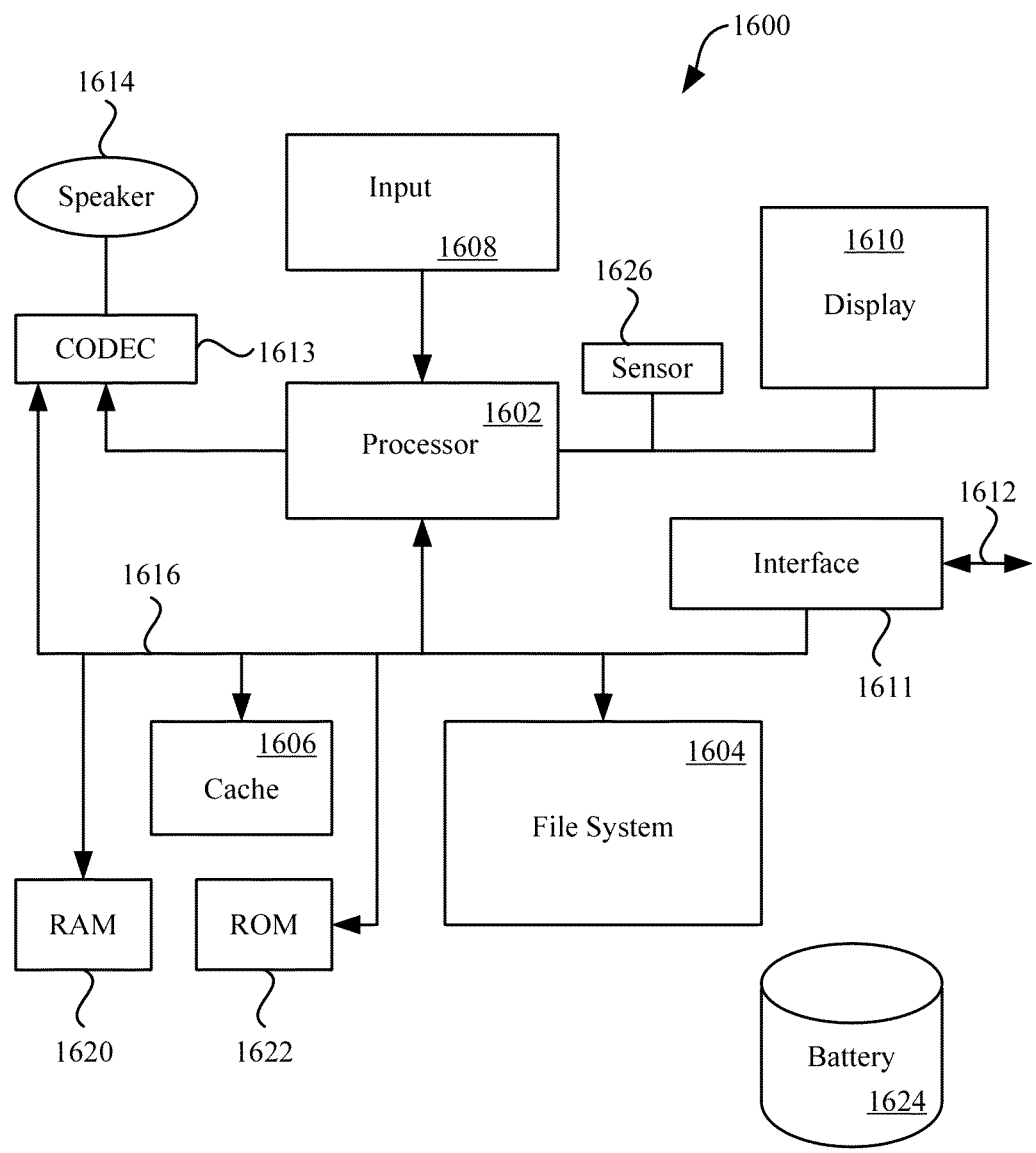
FIG. 16 is a block diagram of an electronic device suitable for use with the described embodiments.

FIG. 16 is a block diagram of an electronic device 1600 suitable for use with the described embodiments. The electronic device 1600 illustrates circuitry of a representative computing device. The electronic device 1600 includes a processor 1602 that pertains to a microprocessor or controller for controlling the overall operation of the electronic device 1600. The electronic device 1600 stores media data pertaining to media items in a file system 1604 and a cache 1606. The file system 1604 is, typically, a storage disk or a plurality of disks. The file system 1604 typically provides high capacity storage capability for the electronic device 1600. However, since the access time to the file system 1604 is relatively slow, the electronic device 1600 can also include a cache 1606. The cache 1606 is, for example, Random-Access Memory (RAM) provided by semiconductor memory. The relative access time to the cache 1606 is substantially shorter than for the file system 1604. However, the cache 1606 does not have the large storage capacity of the file system 1604. Further, the file system 1604, when active, consumes more power than does the cache 1606. The power consumption is often a concern when the electronic device 1600 is a portable media device that is powered by a battery 1624. The electronic device 1600 can also include a RAM 1620 and a Read-Only Memory (ROM) 1622. The ROM 1622 can store programs, utilities or processes to be executed in a non-volatile manner. The RAM 1620 provides volatile data storage, such as for the cache 1606.

The electronic device 1600 also includes a user input device 1608 that allows a user of the electronic device 1600 to interact with the electronic device 1600. For example, the user input device 1608 can take a variety of forms, such as a button, keypad, dial, touch screen, audio input interface, visual/image capture input interface, input in the form of sensor data, etc. Still further, the electronic device 1600 includes a display 1610 (screen display) that can be controlled by the processor 1602 to display information to the user. A data bus 1616 can facilitate data transfer between at least the file system 1604, the cache 1606, the processor 1602, and the CODEC 1613.

In one embodiment, the electronic device 1600 serves to store a plurality of media items (e.g., songs, podcasts, etc.) in the file system 1604. When a user desires to have the electronic device play a particular media item, a list of available media items is displayed on the display 1610. Then, using the user input device 1608, a user can select one of the available media items. The processor 1502, upon receiving a selection of a particular media item, supplies the media data (e.g., audio file) for the particular media item to a coder/decoder (CODEC) 1613. The CODEC 1613 then produces analog output signals for a speaker 1614. The speaker 1614 can be a speaker internal to the electronic device 1600 or external to the electronic device 1600. For example, headphones or earphones that connect to the electronic device 1600 would be considered an external speaker.

The electronic device 1600 also includes a network/bus interface 1611 that couples to a data link 1612. The data link 1612 allows the electronic device 1500 to couple to a host computer or to accessory devices. The data link 1612 can be provided over a wired connection or a wireless connection. In the case of a wireless connection, the network/bus interface 1611 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1626 can take the form of circuitry for detecting any number of stimuli. For example, sensor 1626 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A cover suitable for protecting and controlling an operation of a tablet device having a sensor and a housing, the tablet device further including a display configured for presenting visual content coupled to a processor and an outer protective layer overlaying the display and having a size and a shape in accordance with a full front side of the tablet device, the cover comprising:
a single piece flap pivotally attachable to the tablet device and having the size and the shape of the full front side of the tablet device and comprising:
a first portion movable away from the outer protective layer, the first portion comprising a pattern of micro-perforations that allows external light to pass through the pattern of micro-perforations that forms a light pattern detectable by the sensor, wherein the light pattern provides information used by the processor; and
a second portion movable away from the outer protective layer and opposite the first portion, wherein the first portion and the second portion are capable of moving independently of each other, and wherein the first portion and the second portion are capable of moving with respect to the outer protective layer.

2. The cover as recited in claim 1, wherein the information provided by the light pattern corresponds to cover specific information.

3. The cover as recited in claim 1, further comprising:
an attachment magnet that in an inactive state is located at a first location with respect to an interior surface of the housing of the tablet device such that a first magnetic field at an exterior surface of the housing provided by the attachment magnet is of insufficient strength to form a suitable magnetic attraction.

4. The cover as recited in claim 3, wherein only the attachment magnet moves towards the interior surface of the housing from the first location to a second location in response to an external magnetic field provided by an attachment feature of the tablet device.

5. The cover as recited in claim 4, wherein the attachment magnet at the second location provides a second magnetic field at the exterior surface of the housing that has sufficient strength to form the suitable magnetic attraction.

6. The cover as recited in claim 5, wherein the movement of the attachment magnet from the first location to the second location triggers an electrical signal to the tablet device that confirms that an attachment mechanism is attached to the housing.

7. The cover as recited in claim 1, further comprising a passive element that includes a capacitive element.

8. The cover as recited in claim 7, wherein the capacitive element capacitively couples with a detection mechanism within the tablet device are configured to define a capacitive coupling.

9. The cover as recited in claim 8, wherein the detection mechanism is a multi-touch sensing circuit disposed in the display.

10. The cover as recited in claim 9, wherein the capacitive coupling is interpreted by a second processor in the tablet device as an accessory device information related to the cover.

11. The cover as recited in claim 8, wherein the detection mechanism is capable of detecting the passive information element only in a closed configuration defined be the single piece flap in contact with the outer protective layer.

12. A cover suitable for protecting and controlling an operation of a tablet device having a plurality of magnetic sensors, the tablet device further including a display configured for presenting visual content coupled to a processor and an outer protective layer overlaying the display and having a size and a shape in accordance with a full front side of the tablet device, cover comprising:
a single piece flap comprising:
a first portion having a plurality of magnets capable of detection by the plurality of magnetic sensors when the cover is in a closed configuration defined by the first portion in contact with the outer protective layer, wherein the plurality of magnets comprise a first magnet and a second magnet that encode cover information related to the cover; and
a second portion movable away from the outer protective layer and opposite the first portion, wherein the first portion and the second portion are capable of moving independently of each other, and wherein the first portion and the second portion are capable of moving with respect to the outer protective layer.

13. The cover as recited in claim 12, wherein the cover information is selected from a group consisting of a color and a design.

14. The cover as recited in claim 12, wherein the plurality of magnetic sensors comprises:
a first magnetic sensor that detects a first magnetic field from the first magnet; and
a second magnetic sensor that detects a second magnetic field from the second magnet.

15. The cover as recited in claim 14, wherein the first magnetic sensor and the second magnetic sensor are configured to identify the cover information related to the cover.

16. The cover as recited in claim 15, wherein:
the first magnet comprises a first magnetic polarity and the second magnetic comprises a second magnetic polarity;
the first magnetic sensor is configured to detect the first magnetic polarity; and
the second magnetic sensor is configured to detect the second magnetic polarity.

17. A cover suitable for protecting and controlling an operation of a tablet device having a circuit and a plurality of magnetic sensors, the tablet device further including a display configured for presenting visual content coupled to a processor and an outer protective layer overlaying the display and having a size and a shape in accordance with a full front side of the tablet device, the cover comprising:
a first portion comprising a radio frequency identification (RFID) tag capable of detection by the circuit when the cover is in a fully closed configuration defined by a first portion in contact with the outer protective layer; and
a second portion comprising a plurality of magnets capable of detection by the plurality of magnetic sensors when the cover is in a partially closed configuration defined by the first portion being free of contact with the outer protective layer.

18. The cover as recited in claim 17, further comprising a pattern of micro-perforations that allows external light to pass through the pattern of micro-perforations in the form of a light pattern detectable by a sensor within the tablet device, wherein the light pattern provides cover specific information.

19. The cover as recited in claim 17, wherein the tablet device is configured to display at least some of the visual content in the partially closed configuration.

20. The cover as recited in claim 17, wherein the RFID tag stores information related to the cover, and wherein the information is selected from a group consisting of a serial number, a style, a date and place of manufacture, and an authentication code.

* * * * *